United States Patent
Baba et al.

(10) Patent No.: US 11,079,541 B2
(45) Date of Patent: Aug. 3, 2021

(54) OPTICAL DEFLECTION DEVICE AND LIDAR APPARATUS

(71) Applicant: National University Corporation Yokohama National University, Yokohama (JP)

(72) Inventors: Toshihiko Baba, Yokohama (JP); Fumio Koyama, Tokyo (JP)

(73) Assignee: NATIONAL UNIVERSITY CORPORATION YOKOHAMA NATIONAL UNIVERSITY, Yokohama (JP)

(*) Notice: Subject to any disclaimer, the term of this patent is extended or adjusted under 35 U.S.C. 154(b) by 539 days.

(21) Appl. No.: 16/071,895

(22) PCT Filed: Jan. 11, 2017

(86) PCT No.: PCT/JP2017/000625
§ 371 (c)(1),
(2) Date: Jul. 20, 2018

(87) PCT Pub. No.: WO2017/126386
PCT Pub. Date: Jul. 27, 2017

(65) Prior Publication Data
US 2019/0033522 A1    Jan. 31, 2019

(30) Foreign Application Priority Data
Jan. 22, 2016 (JP) .............. JP2016-010844

(51) Int. Cl.
*G01C 3/08* (2006.01)
*G02B 6/122* (2006.01)
(Continued)

(52) U.S. Cl.
CPC ........... *G02B 6/1225* (2013.01); *G01N 21/49* (2013.01); *G01S 7/4817* (2013.01); *G02B 6/124* (2013.01);
(Continued)

(58) Field of Classification Search
CPC ....... G01S 7/4817; G02B 6/1225; G02B 6/34; G02B 6/124; G02B 6/125;
(Continued)

(56) References Cited

U.S. PATENT DOCUMENTS 9,632,248 B2* 4/2017 Selvaraja ............... G02B 6/124
2004/0170352 A1 9/2004 Summers et al.

FOREIGN PATENT DOCUMENTS

JP    2005091925 A    4/2005
JP    5662266 B2    1/2015
(Continued)

OTHER PUBLICATIONS

European Patent Office, Extended European Search Report Issued in Application No. 17741266.5, dated Aug. 21, 2019, Germany, 5 pages.
(Continued)

*Primary Examiner* — Mark Hellner
(74) *Attorney, Agent, or Firm* — Alleman Hall Creasman & Tuttle LLP

(57) ABSTRACT

An optical deflection device that achieve both high beam quality and wide angular range of deflection and compatibility with an optical integration technology of silicon photonics. The optical deflection device is a silicon photonics device including a periodic structure of a refractive index. The optical deflection device includes two configurations, which are (1) a configuration in which an optical propagation part where light propagates is a microstructure formed on silicon, and (2) a configuration in which the
(Continued)

microstructure constituting the optical propagation part includes a periodic structure that generates slow light and a periodic structure that radiates light. The microstructure formed on the silicon of (1) makes it possible to employ the optical integration technology of silicon photonics and form the optical deflection device. The two periodic structures of (2) make it possible to form a light beam with high beam quality and a wide angular range of deflection.

20 Claims, 18 Drawing Sheets

(51) Int. Cl.
| | | |
|---|---|---|
| *G02B 6/124* | (2006.01) | |
| *G02B 6/34* | (2006.01) | |
| *G02F 1/295* | (2006.01) | |
| *G02B 6/125* | (2006.01) | |
| *G01N 21/49* | (2006.01) | |
| *G01S 7/481* | (2006.01) | |
| *G02B 6/12* | (2006.01) | |

(52) U.S. Cl.
CPC ............... *G02B 6/125* (2013.01); *G02B 6/34* (2013.01); *G02F 1/295* (2013.01); *G02B 2006/12061* (2013.01); *G02B 2006/12107* (2013.01)

(58) Field of Classification Search
CPC ........... G02B 2006/12061; G02B 2006/12107; G02F 1/295; G02F 1/2955; G01N 21/49
USPC ...................................................... 356/5.01
See application file for complete search history.

(56) References Cited

FOREIGN PATENT DOCUMENTS

| JP | 02015121787 A | * | 7/2015 | ............. G02B 6/124 |
|---|---|---|---|---|
| WO | WO 2018155535 A1 | * | 2/2017 | ............. G02B 6/122 |

OTHER PUBLICATIONS

Kondo, K. et al., "Fan-beam steering device using a photonic crystal slow-light waveguide with surface diffraction grating," Optics Letters, vol. 42 No. 23, Nov. 29, 2017, 4 pages.

Gu, X. et al., "Miniature Nonmechanical Beam Deflector Based on Bragg Reflector Waveguide With a Number of Resolution Points Larger Than 1000," IEEE Photonics Journal, vol. 4 No. 5, Oct. 2012, 9 pages.

Neff et al., "Photonic Crystal Superlaffices," The 17th Annual Meeting of the IEEE Lasers and Electro-Optics Society, LEOS 2004, Nov. 11, 2004, 2 pages.

Gu et al., "Giant and high-resolution beam steering using slow-light waveguide amplifier," Optics Express, vol. 19, No. 23, Nov. 7, 2011, 9 pages.

Van Acoleyen et al., "One-Dimensional Off-Chip Beam Steering and Shaping Using Optical Phased Arrays on Silicon-on-Insulator," Journal of Lightwave Technology, vol. 29, No. 23, Dec. 1, 2011, 6 pages.

Kwong et al., "On-Chip Silicon Optical Phased Array for Two-Dimensional Beam Steering," Optics Letters, vol. 39, No. 4, Feb. 15, 2014, 4 pages.

* cited by examiner

Fig. 5A
Fig. 5B
Fig. 5C
Fig. 5D
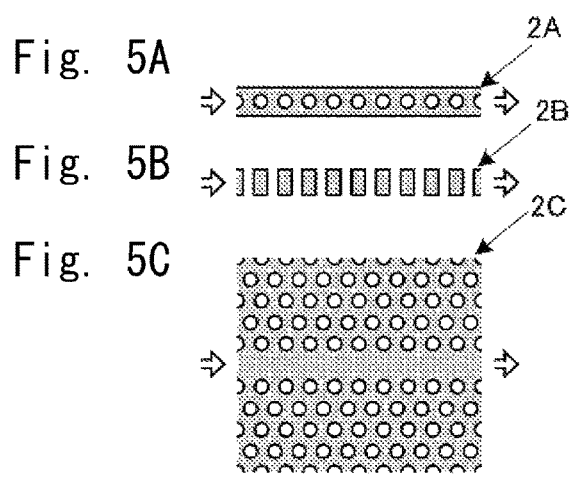
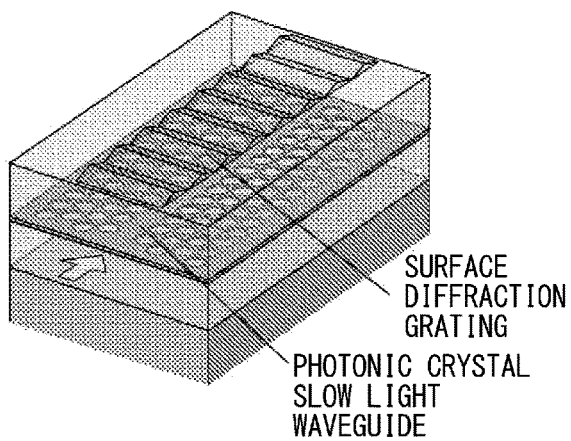

Fig. 7A

WHEN Λ IS SLIGHTLY GREATER THAN a

EMISSION IS LIMITED

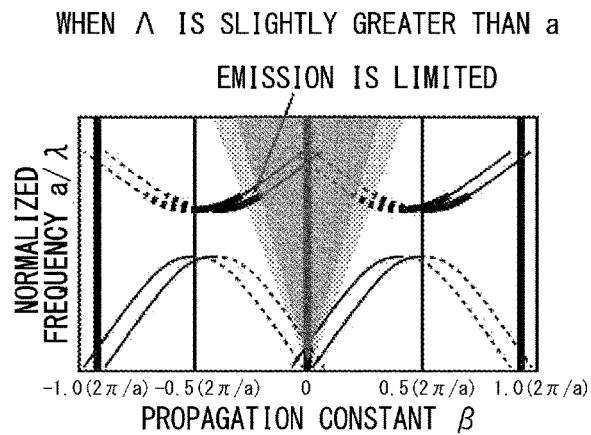

Fig. 7B

IN THE CASE OF a<Λ<2a

EMISSION IN NEGATIVE DIRECTION OCCURS AT EDGES OF EMISSION CONDITION

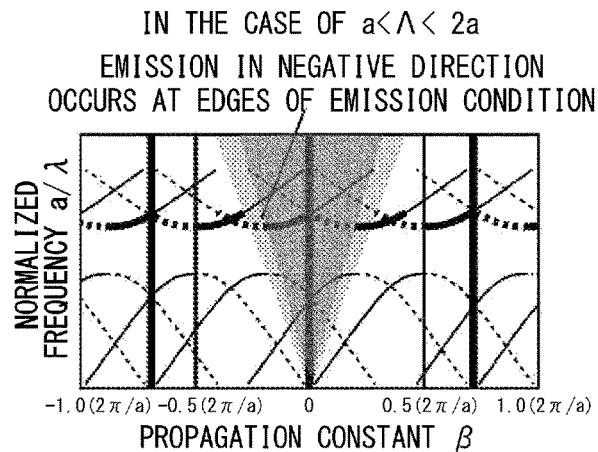

Fig. 7C

WHEN Λ IS SLIGHTLY SMALLER THAN a

EMISSION OCCURS AT A PLURALITY OF ANGLES

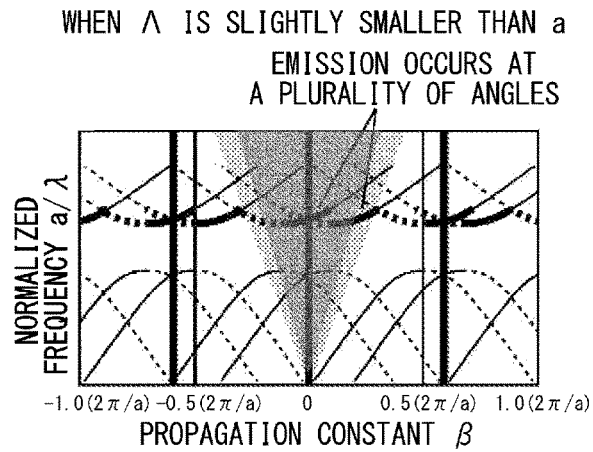

Fig. 7D

IN THE CASE OF Λ=2a

EMISSION IN POSITIVE DIRECTION OCCURS NEAR CENTER OF EMISSION CONDITION

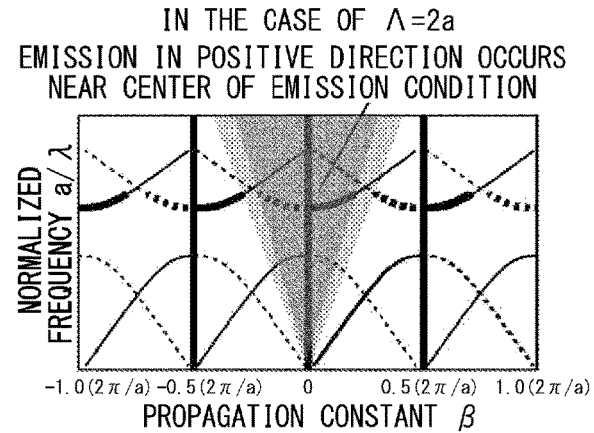

Fig. 7E

IN THE CASE OF Λ>2a

EMISSION OCCURS AT A PLURALITY OF ANGLES

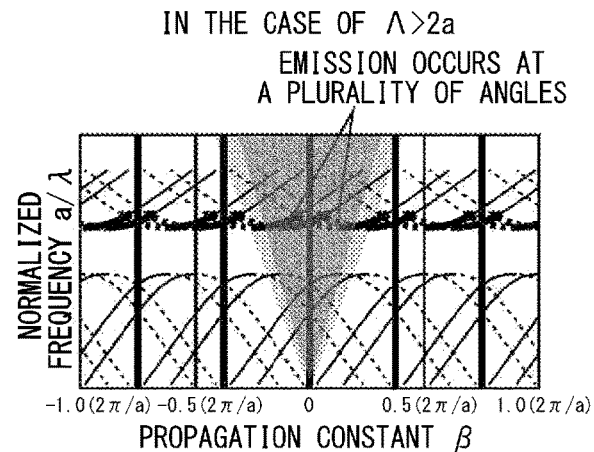

Fig. 7F

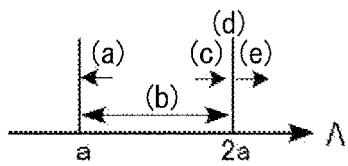

Si SLAB　　　CLADDING
THICKNESS 210nm　IS SiO₂

PHOTONIC CRYSTAL SLOW
LIGHT WAVEGUIDE
WITH SECOND SHIFTED
ROWS IN GRATING

MEASURED GROUP REFRACTIVE
INDEX SPECTRUM

PHOTONIC CRYSTAL SLOW
LIGHT WAVEGUIDE
WITH SECOND SHIFTED
ROWS IN GRATING

OPTICAL DEFLECTION DEVICE AND LIDAR APPARATUS

TECHNICAL FIELD

The present invention relates to an optical deflection device that controls a direction in which light travels and emits a deflected emitted beam, and a lidar apparatus that includes the optical deflection device.

BACKGROUND ART

In the field of LIDAR (Light Detection and Ranging, Laser Imaging Detection and Ranging) and the like used for laser printers, laser displays, three-dimensional laser measurement, etc., optical deflection devices are used as beam scanners for deflecting and scanning light.

As the optical deflection device, for example, a configuration using a mechanical mirror, a configuration using a phase array, and a configuration using light leaked from a waveguide are known.

As the configuration using a mechanical mirror, a polygon mirror and a compact integrated mirror based on the MEMS technology are known.

The configuration using a phase array utilizes the fact that, when many light beams interfere with each other to form a beam, a direction of the beam changes according to the phase of the light beams. This configuration splits light in an optical waveguide integrated on a substrate into light to travel through a number of waveguides, and lets the light be emitted from respective end surfaces of the waveguides or by a diffraction grating into a free space (Non Patent Literature 1)

The configuration using light leaked from a waveguide include a waveguide with a multilayer film structure and a waveguide with a diffraction grating. A leaky waveguide with a multilayer film structure uses the fact that, when light propagating through a waveguide sandwiched between multilayer films leaks and is emitted, emission angles at the respective positions are aligned in order to form a light beam. The leaky waveguide with a multilayer film can scan the light beam by changing a wavelength of light and a refractive index of a waveguide. When the leaky waveguide with the multiplayer film structure operates at a wavelength close to the condition where angular dispersion of the multilayer films is large (slow light condition), the sensitivity to the wavelength and the refractive index increases to thereby increase a beam scanning angle (Non Patent Literature 2).

In a waveguide with a diffraction grating, light gradually leaks from the waveguide by a weak diffraction grating to form a light beam, and the light beam can be scanned by the wavelength and the refractive index of the waveguide (Patent Literature 1).

CITATION LIST

Patent Literature

Patent Literature 1: Japanese Patent No. 5662266

Non Patent Literature

Non Patent Literature 1: "One-Dimensional Off-Chip Beam Steering and Shaping Using Optical Phased Arrays on Silicon-on-Insulator" Karel Van Acoleyen, Katarzyna Komorowska, Wim Bogaerts, Roel Baets JOURNAL OF LIGHTWAVE TECHNOLOGY, VOL. 29, NO. 23, Dec. 1, 2011

Non Patent Literature 2: "Giant and high-resolution beam steering using slow-light waveguide amplifier" Xiaodong Gu, Toshikazu Shimada, and Fumio Koyama 7 Nov. 2011/Vol. 19, No. 23/OPTICS EXPRESS 22683

SUMMARY OF INVENTION

Technical Problem

The configuration using a mechanical mirror is commonly large, a few centimeters square or larger, and includes a movable part. A configuration including a movable part has a problem that the reliability is low, and the operation speed is limited to kHz-order. The configuration to be mounted on a moving body such as an automobile needs resistance to vibration. Thus, low reliability poses a major problem.

The configuration using a phase array and the configuration using light leaked from the waveguide can solve the problem of the configuration using a mechanical mirror, because these configurations have no mechanical movable part. However, the configuration using a phase array and the configuration using light leaked from the waveguide have the following points to consider.

In the configuration using a phase array, a slight disturbance in each waveguide causes the light beam to be formed to have a multi-peak profile, greatly deteriorating the beam quality. When the number of waveguides is small, the phase of each waveguide can be corrected. However, a light beam obtained with a small number of waveguides diverges in the distance, leading to a problem of deteriorated quality. The quality of the light beam is evaluated by, for example, sharpness of the beam, a small divergence angle, and a resolution point. Although many waveguides are necessary to prevent the light beam quality from deteriorating, adjusting phases of many waveguides is unrealistically difficult.

An optical integration technology of silicon photonics is an optical integration technology for monolithically integrating devices such as optical waveguides, light receiving elements, and optical modulators on Si (silicon) using Si-based materials. The optical integration technology of silicon photonics can create a light emitting element by hybrid-integrating group III-V semiconductors. Silicon photonics is an indispensable technique for the optical integration technology, because it is in good compliance with the Si-CMOS manufacturing process.

A configuration using light leaked from the waveguide achieves a high beam quality, because leakage of light is slow, and leakage from a long region does not cause the light to spread even in the distance. As the leaky waveguide with a multilayer film structure can easily adjust the rate of leakage, high beam quality can be achieved, and the scanning angle can be increased by utilizing the Bragg reflection under the slow light condition. However, the leaky waveguide with a multilayer film structure is not compatible with silicon photonics, which is the optical integration technology.

On the other hand, the waveguide with a diffraction grating can use the optical integration technology of silicon photonics. However, as slow light does not appear in the waveguide with a diffraction grating, a large beam scanning angle cannot be achieved using the Bragg reflection under the slow light condition. The beam scanning angle can be increased by inserting an optical element such as a lens outside the waveguide with a diffraction grating. However, this will also increase the beam divergence angle, which limits the resolution points. The resolution points here is defined as a ratio of the maximum beam scanning angle to the beam divergence angle, and is commonly used as a performance index of the beam deflection device. Note that the beam scanning angle is a deflection of an emission angle when an emitted beam is scanned. The greater the angular range the emission angle could fall, the greater beam scanning angle can be achieved.

Thus, non-mechanical optical deflection devices are required to satisfy, for light beams, both high beam quality and wide angular range of deflection and compatibility with the optical integration technology of silicon photonics.

An object of an optical deflection device according to the present invention is to solve the above-mentioned problems and to include both high beam quality by slow light and an emission angle in a wide angular range of deflection and compatibility with the optical integration technology by silicon photonics in a device configuration.

Solution to Problem

An optical deflection device according to the present invention is a silicon photonics device including a periodic structure of a refractive index. The optical deflection device includes two configurations, which are:
(1) a configuration in which an optical propagation part where light propagates is a microstructure formed on an optical waveguide layer including a high refractive index medium such as silicon; and
(2) a configuration in which the microstructure constituting the optical propagation part includes a periodic structure that generates slow light and a periodic structure that radiates light.

The microstructure formed on the silicon of (1) makes it possible to employ the optical integration technology of silicon photonics and form the optical deflection device. The two periodic structures of (2), which are the periodic structure exhibiting the slow light and the periodic structure radiating light, make it possible to form a light beam with high beam quality and a wide angular range of deflection.

The periodic structures of the optical deflection device include:
(a) a first periodic structure including a second low refractive index medium at a period a in a silicon first refractive index medium, the first periodic structure constituting an optical waveguide part, and the optical waveguide part including at least one end in a periodic direction as an incident end; and
(b) a second periodic structure including the second refractive index medium at a period $\Lambda$ ($a<\Lambda<2a$) that is longer than the period a of the first periodic structure in the first refractive index medium, the second periodic structure constituting an emission part, and the emission part including a side end in the periodic direction as an emission end.

The optical deflection device includes
(c) a configuration in which a position where the second periodic structure is disposed is a peripheral part (a tail part) of an intensity distribution of light propagating through the optical waveguide part composed of the first periodic structure, and
(d) a configuration in which the period a is $a=\lambda/2n$ (n is an equivalent refractive index of the light propagating through the optical waveguide part composed of the first periodic structure, and $\lambda$ is a wavelength near a Bragg wavelength).

In the optical waveguide part, by the first periodic structure, a photonic band gap (stop band) is generated in the vicinity of the Bragg wavelength satisfying $a=\lambda/2n$, and a group refractive index $n_g$ inside the optical waveguide part increases, and the slow light with a small group velocity is generated. The slow light propagates with divergence in the electromagnetic field (leaking component) around. The second periodic structure causes the emission part to be coupled to the leaking component of the slow light in the optical waveguide part, scattered, diffracted, and then gradually emitted upward or in an oblique direction with respect to a waveguide traveling direction. The emitted beam is emitted from a wide range along the direction of the waveguide in which the light travels, and the emitted light is in phase. Thus, the emitted beam becomes a high quality and sharp light beam.

In the slow light, the propagation constant $\beta$ greatly changes by a slight change in the wavelength $\lambda$ of light and the refractive index n of the waveguide part. A change in the propagation constant $\beta$ of the first periodic structure changes the coupling condition for the second periodic structure, thereby changing an angle $\theta$ of the emitted beam. Thus, the angle $\theta$ of the emitted beam can be changed by changing the wavelength $\lambda$ of light and the refractive index n of the waveguide to change the propagation constant $\beta$.

In the first periodic structure and the second periodic structure, etches of the first periodic structure are larger than etches of the second periodic structure.

The sizes of the etches of the periodic structure are the sizes in a depth direction orthogonal to the traveling direction in which the light formed by the periodic structure propagates in the refractive index medium of the periodic structure. A difference between the sizes of the etches leads to a difference between the strength of the effect of the periodic structure on the light.

When the first periodic structure is formed of a photonic crystal having periodic holes in the refractive index medium, the etches of the first periodic structure are holes provided in the photonic crystal. On the other hand, when the second periodic structure is formed of a diffraction grating including recessions and projections formed on a refractive index medium, the etches of the second periodic structure are recesses and projections. Whereas when the second periodic structure is formed of a photonic crystal including periodic holes in the refractive index medium, the etches of the second periodic structure are depths of holes provided in the photonic crystal.

When the etches of the first periodic structure are made larger than the etches of the second periodic structure to generate the slow light in the first periodic structure and the leaking component of the slow light is coupled to the second periodic structure, light leaks out at a low speed from the second periodic structure, is diffracted, and emitted as the emitted beam.

The optical waveguide part of the first periodic structure is a slow light waveguide. The slow light waveguide can be a photonic crystal waveguide formed of a photonic crystal. The diffraction grating of the emission part of the second periodic structure can also be formed of a photonic crystal.

The configuration of the photonic crystal waveguide of the first periodic structure can be in a plurality of forms. For example, the photonic crystal waveguide of the first periodic structure may be in a form of an air-bridge slow light waveguide including an air layer between claddings on a silicon substrate or in a form of a cladding embedded slow light waveguide that is embedded in a cladding.

The configuration of the diffraction grating of the second periodic structure can be in a plurality of forms. For example, the diffraction grating may be in a form of a surface diffraction grating, an air-bridge slow light waveguide including an air layer, an embedded diffraction grating that is embedded in a cladding, or a diffraction grating formed on a silicon substrate.

In the form of the air-bridge diffraction grating, a layer of a diffraction grating having a different refractive index is provided by sandwiching an air layer between air-bridge slow light waveguides or between claddings of a cladding embedded slow light waveguide so as to form a diffraction grating.

In the form of the embedded diffraction grating, in a cladding in which the cladding embedded slow light waveguide is embedded, a layer of a diffraction grating having a different refractive index is embedded in an upper part of an upper cladding, in an upper cladding, or in a lower cladding so as to form a diffraction grating.

In the form in which the diffraction grating is formed on a silicon substrate, the diffraction grating can be formed by directly etching a recessed and projected shape in a silicon substrate part that is brought into contact with a cladding.

A position where the diffraction grating is provided in the photonic crystal can be in a plurality of forms. For example, diffraction gratings may be provided on both sides of a photonic crystal waveguide, or a diffraction grating may be provided on an upper surface of the photonic crystal waveguide.

In the photonic crystal waveguide constituting the slow light waveguide, the periodic structure of the photonic crystal may be composed of a double periodic structure including two kinds of periods, which are a short period and a long period. The periodic structure for the short period has large etches and constitutes the slow light waveguide of the first periodic structure. The periodic structure for the long period has small etches and constitutes the diffraction grating of the second periodic structure.

The first and second periodic structures may be a one-dimensional photonic crystal waveguide including a linear periodic structure or a two-dimensional photonic crystal waveguide including a linear defect in a planar periodic structure.

A reflector for reflecting emitted light emitted from the emission part may be included on a substrate side below the second periodic structure. The reflector can increase an amount of the emitted light by reflecting the emitted light traveling toward inside of the optical deflection device so that it travels toward outside among the emitted light emitted from the emission part.

(Another Configuration Example of Double Periodic Structure)

Another configuration example of the double periodic structure is a double periodic structure in which circular holes having two different diameters are repeated along the waveguide in the plane of the photonic crystal. This double periodic structure includes a periodic structure in which circular holes with large diameters are repeated and a periodic structure in which circular holes with small diameters are repeated. When the diameter of a reference circular hole is $2r$ and a difference between the diameters of the circular holes is $2\Delta r$, the diameter of the large diameter circular hole is $2(r+\Delta r)$, and the diameter of the small diameter circular hole is $2(r-\Delta r)$.

(Configuration for Controlling Emission Angle)

The sensitivity of the emission angle $\theta$ of the emitted beam changes in relation to the wavelength $\lambda$ of the light and the refractive index n of the refractive index medium constituting the first periodic structure. A slight change in the wavelength or the refractive index causes the emission angle $\theta$ to greatly change.

The optical deflection device according to the present invention may include, as a configuration for controlling the emission angle of the emitted beam, a wavelength control unit that controls the wavelength of incident light and/or a refractive index control unit that controls the refractive index of the first periodic structure and/or the refractive index of the second periodic structure.

The emission angle $\theta$ of the emitted beam is changed by the wavelength control unit changing the wavelength $\lambda$ of the incident light and/or the refractive index control unit changing the refractive index n of the refractive index medium inside the periodic structure.

A control unit may further be included to control the wavelength control unit to change the wavelength and/or the refractive index control unit to change the refractive index. The control unit can sequentially change the emission angle $\theta$ in a time series manner by controlling time of the changes in the wavelength and/or the changes in the refractive index. The emitted beam can be scanned by sequentially changing the emission angle $\theta$.

(Configuration for Aligning Emission Angle of Emitted beam in One Direction)

An optical system (cylindrical lens) for aligning the emission angle of the emitted beam emitted from the emission part in one direction is provided in front of the emission part in an emission direction. This optical system can align the spread of a periodic beam emitted from the emission part in one direction to thereby improve the beam quality of the emitted beam.

(Configuration for Expanding Range of Emission Angle)

Two optical paths are switchably connected to both ends of the optical waveguide part via the optical path change switch optical path. The two optical paths are switched by the optical path change switch optical path to allow the incident light to enter the switched optical path, so that the optical paths are switched and incident light is allowed to enter from the both ends of the optical waveguide part of the optical deflection device. The emission angle $\theta$ changes also according to the direction of the propagation constant $\beta$. Thus, the angular range of the emission angle $\theta$ is expanded by changing the direction of the light incident on the optical waveguide part of the first periodic structure by means of the optical path change switch.

(Two-Dimensional Beam Scanning)

The optical deflection device according to the present invention can be applied not only to one-dimensional beam scanning in which the angle of the emitted beam is changed in one direction but also to two-dimensional beam scanning in which the angle of the emitted beam is changed in two different directions.

A first form of the two-dimensional beam scanning includes an array configuration in which a plurality of optical waveguide parts are arranged in parallel and an incident light change switch that switches the plurality of optical waveguide parts arranged in an array to allow the incident light to enter one of them. An optical system such as a cylindrical lens is further included in front of the array configuration in the emission direction. The optical system aligns the emission angle of the emitted beam in one direction.

The two-dimensional beam scanning is performed by a combination of beam scanning in a first emission direction that depends on a direction of the emission part and beam scanning in a second emission direction that depends on a selection of the optical waveguide part made by the incident light change switch.

A second form of the two-dimensional beam scanning includes a phase array composed of an array configuration in which a plurality of optical waveguide parts are arranged in parallel and a phase adjuster that makes incident light with an adjusted phase enter the plurality of optical waveguide parts. The phase array performs the two-dimensional scanning by the phase adjuster adjusting the phase of the incident light incident on each of the optical waveguide parts.

(Apparatus Using Reflected Light)

The optical deflection device according to the present invention can receive the reflected light that is emitted light reflected and returns and can be applied to an apparatus using reflected light. A lidar apparatus that uses the reflected light can be configured to include an optical deflection device, a pulse light source that emits pulsed light to the optical deflection device, and a light detection unit that detects light received by the optical deflection device. The optical deflection device inputs and outputs light in two directions, i.e., emits the emitted light and receive the reflected light caused by this emitted light. In the lidar apparatus, the emitted light can be emitted from and the reflected light can be incident on one optical deflection device. The lidar apparatus may include a switching unit that switches between pulse light directed to the optical deflection device and light received by the optical deflection device.

A first form of the switching unit may be composed of a splitter provided in an optical waveguide between the pulse light source and the optical deflection device. The splitter may include a photodetector at one end thereof.

A second form of the switching unit may be composed of an optical switch provided in an optical waveguide between the pulse light source the optical deflection device. The optical switch switches between the pulse light source and the photodetector.

A third form of the switching unit may be composed of a photodetector provided in an optical waveguide between the pulse light source and the optical deflection device. The photodetector can freely switch between optical waveguide and photodetection A fourth form of the switching unit may be composed of an element that serves as the pulse light source and the photodetector and can freely switch between generating pulse light and photodetection. This element can operate as a photodiode, for example, by applying a reverse bias to a semiconductor laser of the pulse light source.

Advantageous Effects of Invention

As described above, the optical deflection device according to the present invention is a leaky waveguide optical deflection device having compatibility with silicon photonics and exhibiting a slow light effect, and can achieve both high beam quality and deflection of a light beam to be emitted in a direction at a large deflection angle and compatibility with an optical integration technology of silicon photonics.

BRIEF DESCRIPTIONS OF DRAWINGS

FIGS. 5A to 5D are diagrams for describing a slow light waveguide using a photonic crystal;

FIGS. 7A to 7E are diagrams for describing a emission condition of slow light;

FIG. 7F is a legend for FIGS. 7A to 7E;

DESCRIPTION OF EMBODIMENTS

Hereinafter, embodiments of the present invention will be described in detail with reference to the drawings. A schematic configuration example and an operation of an optical deflection device according to the present invention will be described with reference to FIGS. 1A to 3B. A scanning operation of an emitted beam will be described with reference to FIG. 4A to FIG. 4D. A slow light waveguide using a photonic crystal will be described with reference to FIGS. 5A and 5B. A emission condition of slow light will be described with reference to FIGS. 6A to 7E. A configuration example of an optical waveguide part will be described with reference to FIGS. 8 to 9B. An example of a configuration of an emission part will be described with reference to FIGS. 10 to 12D. A configuration example for expanding an emission angle will be described with reference to FIGS. 13A to 14B. A configuration example of a two-dimensional beam scanning will be described with reference to FIGS. 15A to 16B. An application of the optical deflection device to an apparatus using reflected light will be described with reference to FIGS. 17A to 17C. Forms of a lidar apparatus according to the present invention will be described with reference to FIGS. 18A to 18D.

(Overview of Optical Deflection Device)

Configuration of Optical Deflection Device

Figure 1A:
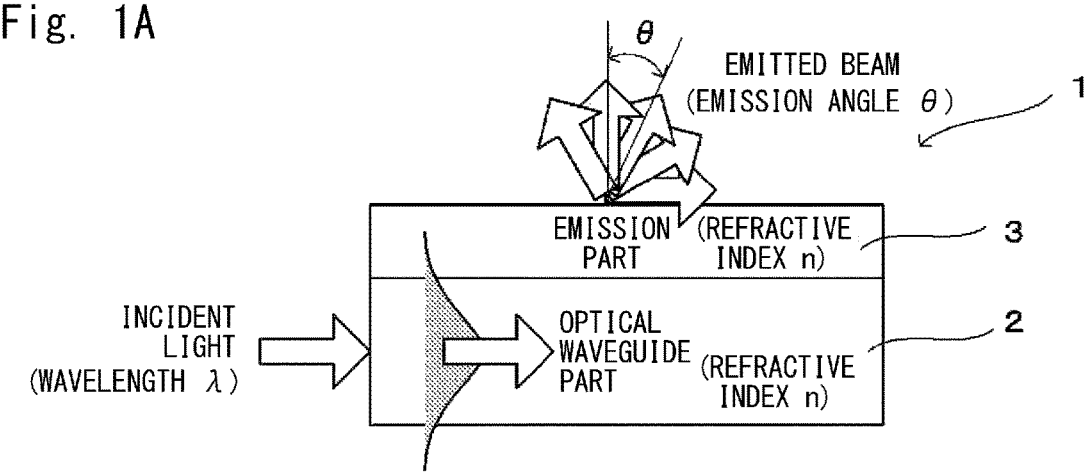
FIGS. 1A and 1B are schematic diagrams for describing a configuration of an optical deflection device according to the present invention.
Figure 1B:
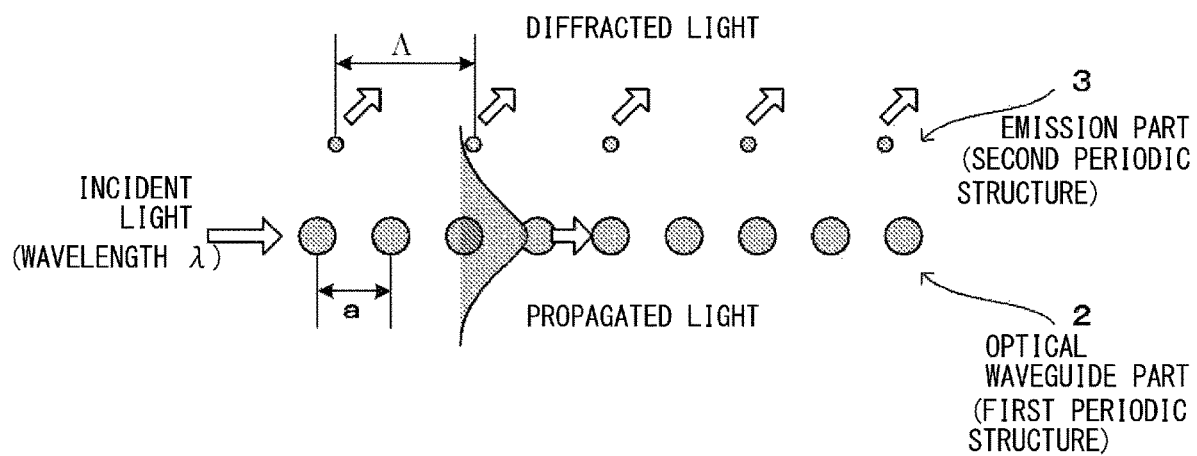

FIGS. 1A and 1B are schematic diagrams for describing a configuration of the optical deflection device. FIG. 1A is a diagram for describing a schematic configuration, and FIG. 1B is a diagram for describing an overview of a periodic structure of the optical deflection device.

In FIG. 1A, an optical deflection device 1 includes an optical waveguide part 2 that propagates incident light, and an emission part 3 that diffracts light leaked from the optical waveguide part 3 and emits an emitted beam at an emission angle θ.

In FIG. 1B, the optical deflection device 1 includes a periodic structure with a periodically changing refractive index. The periodic structure includes two periodic structures, which are a first periodic structure and a second periodic structure.

The first periodic structure includes a second refractive index medium at a period in a first refractive index medium that is a silicon substrate. The first periodic structure constitutes the optical waveguide part 2 including at least one end in a periodic direction as an incident end.

The second periodic structure includes a second refractive index medium at a period Λ, which is longer than the period a of the first periodic structure (a<Λ<2a), in the first refractive index medium. The second periodic structure constitutes the emission part 3 having a side end in the periodic direction as an emission end. For example, a refractive index medium having a refractive index higher than that of the second refractive index medium can be selected as the first refractive index medium.

The second periodic structure is disposed close to the optical waveguide part 2 within the distance in which the propagated light from the optical waveguide part 2 leaks, and is disposed in the periphery of the electric field intensity distribution of the propagated light propagating through the first periodic structure. The period a of the first periodic structure is represented by the relationship of a=λ/2n, where n is an equivalent refractive index of the propagated light propagating through the first periodic structure, and λ is a wavelength in the vicinity of the Bragg wavelength.

The periodic structure of the optical deflection device 1 can be formed by the optical integration technology of silicon photonics.

The light leaked out from the propagated light propagating through the optical waveguide part 2 is coupled to the second periodic structure of the emission part 3, diffracted at the emission angle θ, and emitted as an emitted beam.

Figure 2A:
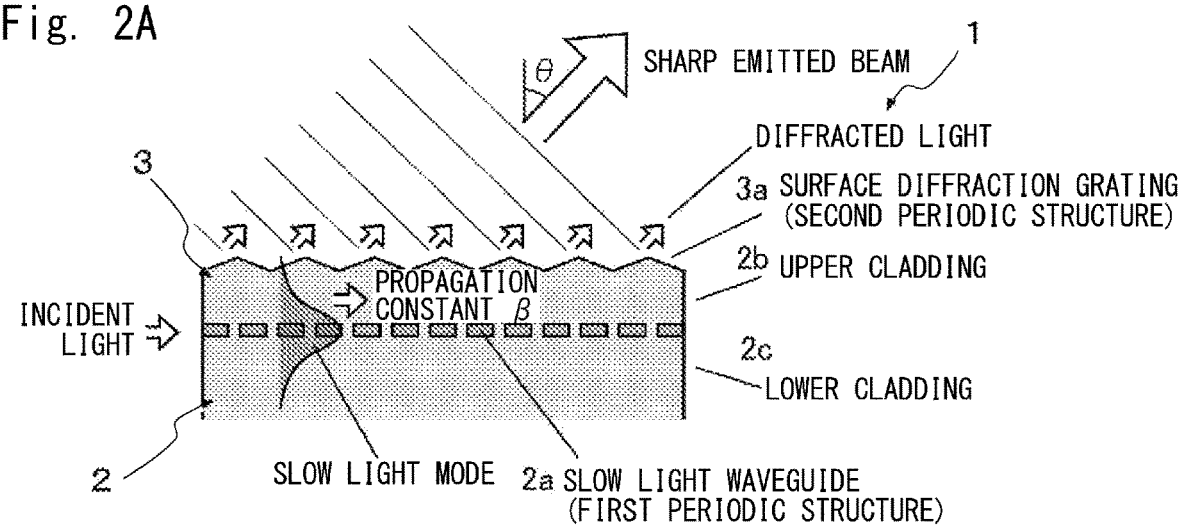
FIGS. 2A to 2D are diagrams showing a configuration example of the optical deflection device according to the present invention.

FIGS. 2A to 2D show configuration examples of the optical deflection device 1. In FIG. 2A, the optical waveguide part 2 of the optical deflection device 1 includes a slow light waveguide 2a. The slow light waveguide 2a is composed of the second refractive index medium disposed at the period a between an upper cladding 2b and a lower cladding 2c, which are the first refractive index media. The slow light waveguide 2a is formed in the first periodic structure in which the second refractive index medium is periodically disposed at the period a in the cladding having a refractive index of the first refractive index medium. A medium having a higher refractive index than that of the second refractive index medium can be selected as the first refractive index medium. When light is made incident from a direction in which light propagates through the periodic structure having deep etches, which are formed by, for example, deeply etching a material with a high refractive index, light having a low group velocity (slow light) is generated. The slow light waveguide 2a propagates incident light entering from one end in a slow light mode at a low group velocity.

The emission part 3 of the optical deflection device 1 includes a surface diffraction grating 3a at a position adjacent to the upper cladding 2b. The surface diffraction grating 3a includes a projected and recessed shape that is projected and recessed at the period Λ. The shape projected and recessed at the period Λ constitutes the second periodic structure of the period Λ between the refractive index medium having the refractive index n constituting the surface diffraction grating 3a and an external medium having a refractive index $n_{out}$ such as air.

A propagation constant β of the slow light propagating through the slow light waveguide 2a having the first periodic structure greatly changes by a slight change in a propagation status such as the wavelength λ of the light and the refractive index n of the waveguide. Such light propagates with divergence in the electromagnetic field (leaking component) around. When the emission part 3 having a periodic structure (the second periodic structure) with shallow etches, which are formed by shallowly etching a material with a small refractive index, is disposed within the distance in which the emission part 3 is brought into slight contact with the leaking component, the slow light is coupled to the emission part 3, scattered, diffracted, and then gradually emitted upward or diagonally. The emission occurs in a wide range along the direction of the waveguide in which the light travels, and the emitted light is in phase. Therefore, when the optical deflection device is viewed from the lateral direction along the direction in which the light propagates, the emitted beam becomes a high quality sharp light beam.

A change in the wavelength λ of the incident light and a change in the refractive index n of the refractive index medium constituting the first periodic structure causes the propagation constant β of the optical waveguide part 2 to change, and a condition in which the light coupled to the second periodic structure of the emission part 3 to change. As a result, the emission angle θ of the emitted beam changes.

Figure 2B:
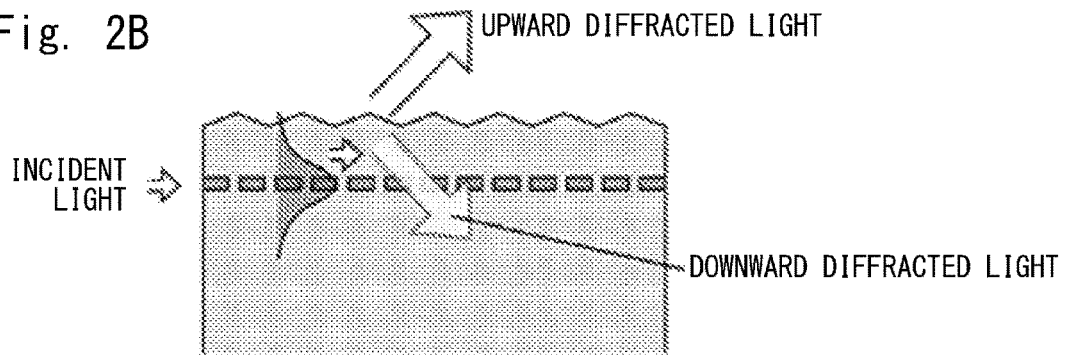

The light leaving the diffraction grating is not necessarily emitted in the obliquely upward direction but is emitted also in the obliquely downward direction. As the structure of the optical deflection device is vertically asymmetric, light is emitted in the obliquely downward direction, although the intensity of the emitted light is not identical to that of the light emitted in the obliquely upward direction. In FIG. 2B, the light emitted in the obliquely upward direction is referred to as upward diffracted light, and the light emitted in the obliquely downward direction is referred to as downward diffracted light.

Figure 2C:
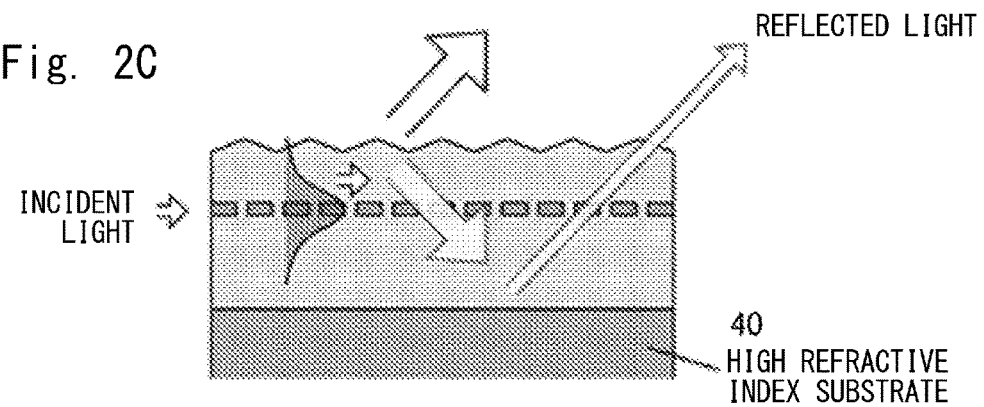
Figure 2D:
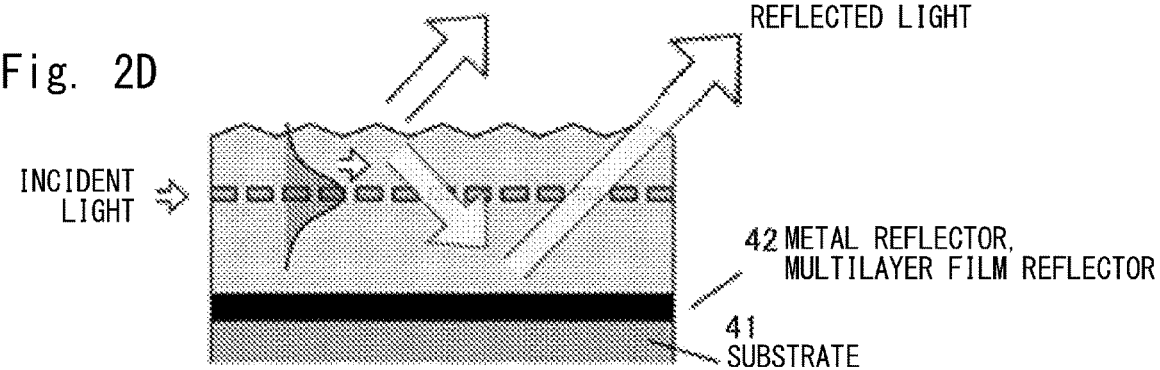

The optical deflection device 1 may include a reflector at a lower part of the lower cladding 2c. FIGS. 2C and 2D show configuration examples including a reflector.

The configuration example shown in FIG. 2C shows a case where a high refractive index medium such as Si is present as a substrate of the structure. The light emitted in the downward direction is reflected at a boundary surface between the lower cladding 2c and a high refractive index substrate 40, and returns to travel in the obliquely upward direction. When the thickness of the lower cladding 2c is optimized to cause the reflected light to interfere with the light emitted previously in the obliquely upward direction, the light emitted in the obliquely upward direction can be intensified as a whole. In the configuration example shown in FIG. 2D, a reflector 42 such as a metal reflector or a multilayer film reflector is inserted between a substrate 41 and the lower cladding 2c to further intensify the light emitted in the obliquely upward direction.

(Control on Emission Angle)

Next, control on the emission angle θ by the slow light will be described.

Change in the Emission Angle

The propagation constant β of the slow light, which is light having a low group velocity, changes depending on the wavelength λ of the light and the refractive index n of the refractive index medium constituting the first periodic structure. When this slow light is coupled to the second periodic structure, the propagation constant β is converted to $β_N=β-(2π/Λ)N$. Here, N is an integer.

The value of the converted propagation constant $β_N$ becomes a wavenumber in the horizontal direction of the plane, and light is emitted in a free space. The emission angle θ having the vertical direction of the plane 0° is calculated by the following formula (1). In this formula (1), the wavenumber of light in the free space is $k_0=2π/λ$.

$$θ=\sin^{-1}(β_N/k_0)=\sin^{-1}n_N \quad (1)$$

Here, $n_N=β_N/k_0$.

The condition under which light is emitted at the emission angle given by formula (1) is $n_N≤1$. The propagation constant β is expressed by the following inequality (2).

$$β-(2π/Λ)N≤k_0 \quad (2)$$

Hereinafter, the sensitivity of the emission angle θ to the wavelength λ or the refractive index n is calculated based on the above formula (1) and inequality (2).

[Sensitivity of Emission Angle θ to Wavelength λ]

The sensitivity of the emission angle θ to the wavelength λ is represented by the following formula (3).

$$dθ/dλ = (β_N + λdβ/dλ)/[2π\sqrt{1-(β_N/k_0)^2}] \quad (3)$$
$$= (n_N + n_g)/[λ\sqrt{1-n_N^2}]$$

In the formula (3), $n_g$ is a group refractive index (a reduction rate of the group velocity) of the slow light waveguide.

Commonly, $n_g$ is given by the following formula.

$$n_g = c·dβ/dω = (λ^2/2π)dβ/dλ$$

In this formula, c is the speed of light in vacuum, and ω is an angular frequency of light. In the slow light waveguide, $n_g$ is a large value of several tens or more.

On the other hand, the refractive index $n_N$ of the emission part relating to the propagation constant $β_N$ converted by the coupling is $n_N<1$ and can be regarded as $n_g>>n_N$. Thus, the formula (3) can be expressed by the following formula (4).

$$dθ/dn≈n_g/[λ\sqrt{(1-n_N^2)}] \quad (4)$$

Hereinafter, "≈" is denoted by the sign "=*".

The formula (4) indicates that when the group refractive index $n_g$ increases by the slow light waveguide, the wavelength sensitivity of the emission angle θ increases substantially in proportion to the group refractive index $n_g$, and a slight change in the wavelength λ causes the emission angle θ to greatly change.

[Sensitivity of Emission Angle θ to Refractive Index n]

a. The sensitivity of the emission angle θ to the refractive index n is represented by the following formula (5).

$$dθ/dn = *(n_g/n)/[\sqrt{(1-n_N^2)}](dλ/dn)/(λ/n) \quad (5)$$
$$= *n_g/[n\sqrt{(1-n_N^2)}]$$

The formula (5) indicates that when the group refractive index $n_g$ increases by the slow light waveguide, the wavelength sensitivity of the emission angle θ increases substantially in proportion to the group refractive index $n_g$, and a slight change in the refractive index n causes the emission angle θ to greatly change.

Therefore, the emission angle θ can be greatly changed by a slight change in the wavelength λ and the refractive index n.

Configuration of Emission Angle Control

FIGS. 3A to 4D are diagrams for describing a configuration for controlling the emission angle of the optical deflection device according to the present invention.

Figure 3A:
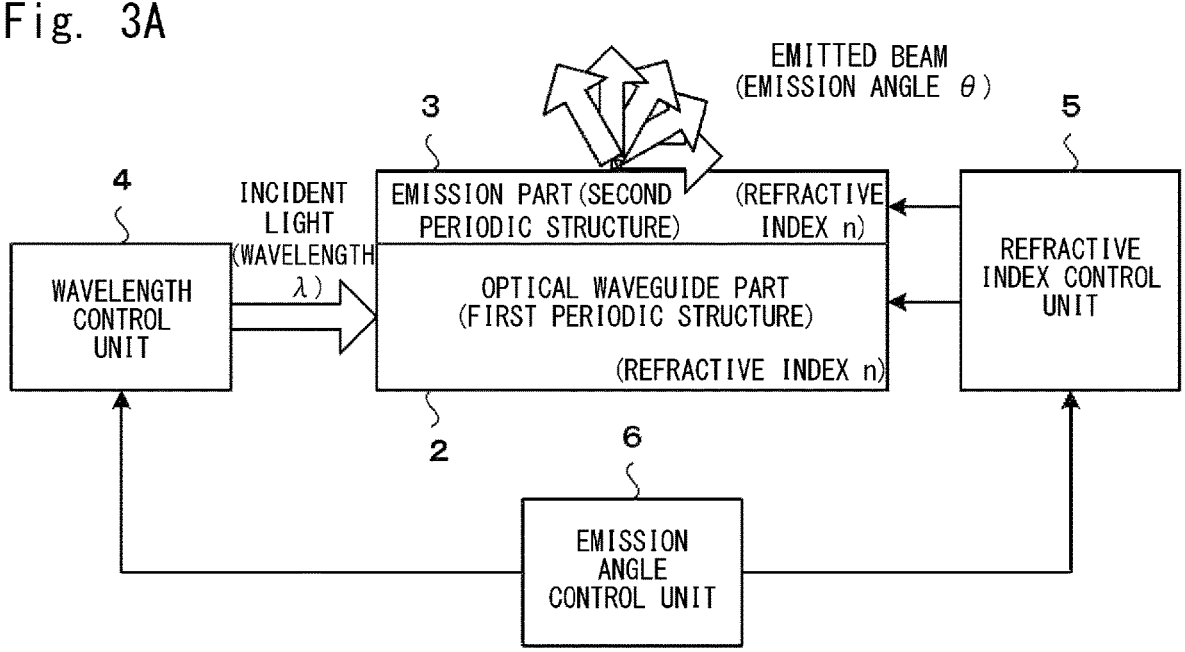
FIGS. 3A and 3B are diagrams for describing a configuration for controlling an emission angle of the optical deflection device according to the present invention.

FIG. 3A is a schematic diagram of a configuration example for controlling the emission angle of the optical deflection device. In FIG. 3A, the optical deflection device 1 includes, in addition to the optical waveguide part 2 and the emission part 3 having two periodic structures, a wavelength control unit 4 that controls the wavelength λ of incident light entering the optical waveguide part 2, a refractive index control unit 5 that controls the refractive index n of the optical waveguide part 2 and/or the emission part 3, and an emission angle control unit 6 that controls the wavelength control unit 4 and the refractive index control unit 5.

The emission angle control unit 6 controls one or both of the wavelength control unit 4 and the refractive index control unit 5 and controls the wavelength and/or the refractive index to thereby control the emission angle.

Figure 3B:
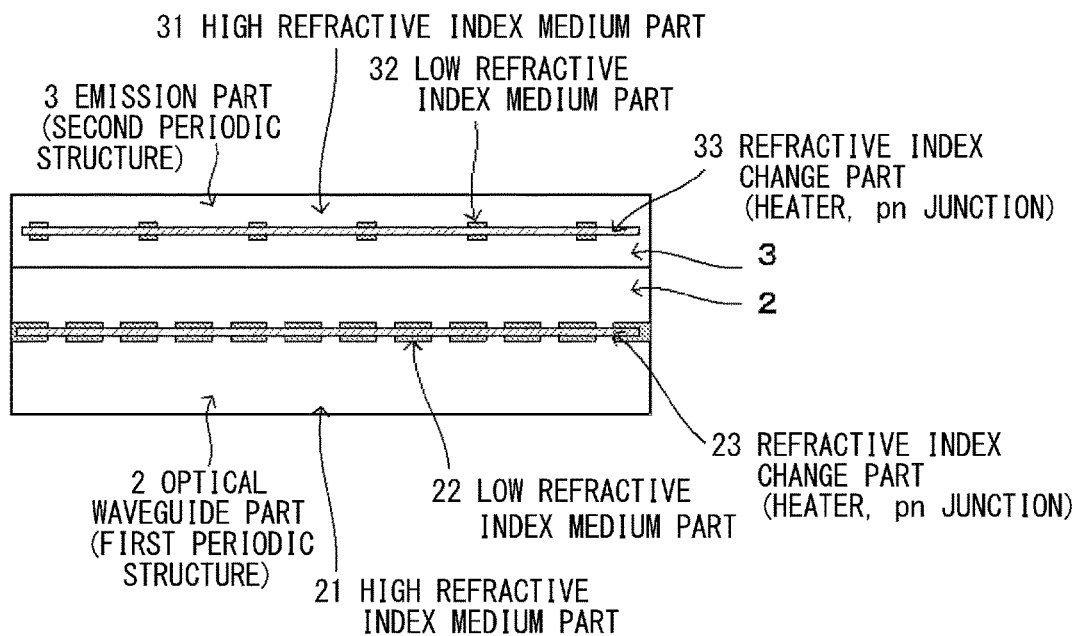

FIG. 3B is a schematic diagram for describing a configuration example of the optical waveguide part and the emission part that control the emission angle of the optical deflection device. Here, an example in which a high refractive index medium is used as the first refractive index medium, and a low refractive index medium is used as the second refractive index medium is shown.

In FIG. 3B, in the optical waveguide part 2, a slow light waveguide is composed of a high refractive index medium 21 composed of upper and lower claddings and a low refractive index medium 22 periodically provided in the cladding. The optical waveguide part 2 includes a refractive index change part 23 that controls the refractive index of the refractive index medium.

The emission part 3 is composed of a high refractive index medium 31 and a low refractive index medium 32 that is periodically provided in the high refractive index medium 31. The emission part 3 includes a refractive index change part 33 that controls the refractive index of the refractive index medium.

The refractive index change part 23 and the refractive index change part 33 can be composed of, for example, a heater or a p-n junction. The refractive index change part 23 and the refractive index change part 33 change carrier density by controlling the temperature by a heater or applying a voltage by the p-n junction so as to change the refractive index n of the optical waveguide part. The refractive index n is the refractive index of the optical waveguide part determined by the refractive index of the high refractive index medium and the refractive index of the low refractive index medium.

Figure 4A:
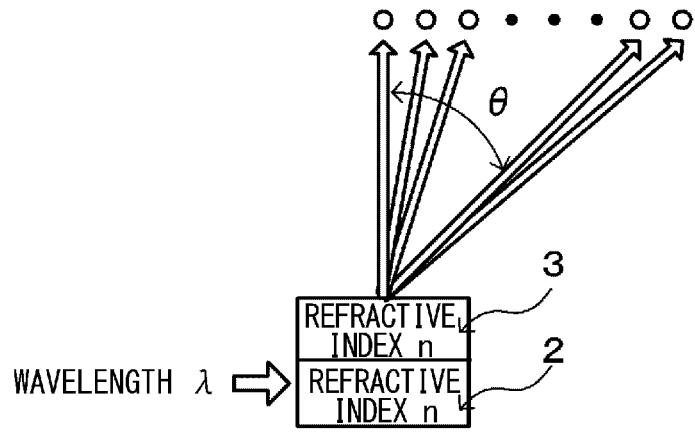
FIGS. 4A to 4D are diagrams for describing a scanning operation of an emitted beam of the optical deflection device according to the present invention.
Figure 4B:
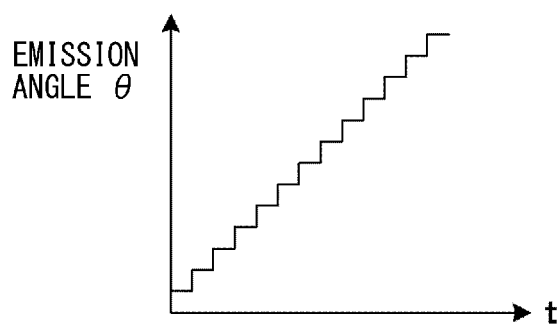
Figure 4C:
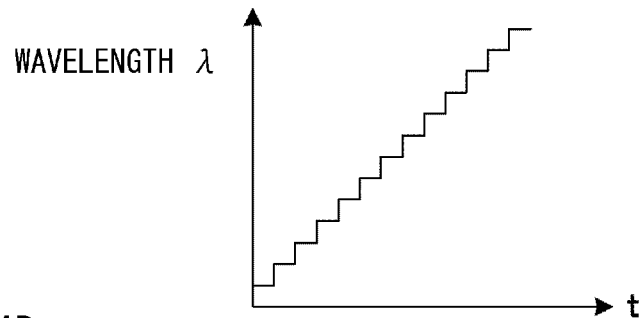
Figure 4D:
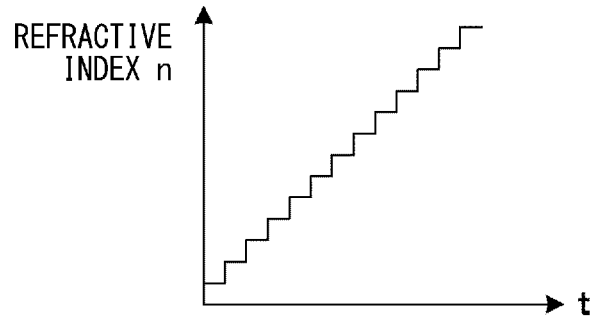

FIG. 4A schematically shows a change in the emission angle θ by the wavelength λ and the refractive index n. FIGS. 4B to 4D show examples of changes in the emission angle θ, the wavelength λ, and the refractive index n, respectively.

FIGS. 4A to 4D show examples in which the wavelength λ and the refractive index n are changed stepwise in a time series manner. As a result of these changes, the emission angle θ changes stepwise in a time series manner, and the emitted beam is emitted to discrete iremission points. The resolution points of the emitted beam can be adjusted by adjusting the changes in the wavelength λ and the refractive index n, in addition to changing the length of light leakage. The resolution points of the emitted beam is the number of points iremitted within a predetermined interval, which corresponds to the iremission density of discrete iremission points.

In addition to the wavelength λ and the refractive index n, the emission angle θ can also be changed by the direction of the propagation constant β of the light propagating through the optical waveguide part. The emission angle θ can be also changed by changing the direction of the light entering the optical waveguide part by means of an optical path change switch. In this way, it is possible to expand a range in which the emission angle θ can be changed.

(Slow Light Structure by Photonic Crystal)

Next, a configuration of a slow light structure composed of a photonic crystal will be described using configuration examples of a slow light waveguide and a diffraction grating with reference to FIGS. 5A to 7E. An example in which a high refractive index medium is used as the first refractive index medium, and a low refractive index medium is used as the second refractive index medium is shown here.

First Periodic Structure and Slow Light Waveguide:

Examples of the first periodic structure that generate slow light include a photonic crystal waveguide. FIGS. 5A to 5C show examples of the first periodic structure by a photonic crystal waveguide. FIGS. 5A and 5B show one-dimensional photonic crystal waveguides. FIG. 5C shows a two-dimensional photonic crystal waveguide.

A one-dimensional photonic crystal waveguide 2A of FIG. 5A is an example of a configuration in which circular holes are periodically arranged in a rectangular channel waveguide (thin Si line etc.) made of a high refractive index medium such as a semiconductor. A one-dimensional photonic crystal waveguide 2B of FIG. 5B is an example of a configuration in which a rectangular channel waveguide of a high refractive index medium is periodically separated.

In this configuration, a photonic band gap (stop band) is generated in the vicinity of the Bragg wavelength satisfying $a=\lambda/2n$, and $d\beta/d\lambda \propto n_g$ gradually increases at the normalized frequency $a/\lambda$ in the vicinity of the Bragg wavelength satisfying $a=\lambda/2n$, thereby generating slow light.

In the circular hole arrangement, for example, with λ=*1550 nm, a thickness of Si can be about 200 nm, a width can be about 400 nm, a diameter of a circular hole can be about 200 nm, and the period a can be about 400 nm.

A two-dimensional photonic crystal waveguide 2C of FIG. 5C has a configuration in which the same circular holes are arranged two-dimensionally periodically, for example, in a triangular lattice on semiconductor (Si etc.) slabs of the same thicknesses, with one row of the circular holes being removed. Even in the configuration of this two-dimensional photonic crystal waveguide 2C, a photonic band gap occurs in the vicinity of the Bragg wavelength, the group refractive index $n_g$ increases, and slow light is generated.

In both the one-dimensional photonic crystal waveguide and the two-dimensional photonic crystal waveguide, a large slow light effect of $n_g>100$ occurs at the Bragg wavelength, but $n_g$ becomes gradually smaller as it moves away from the Bragg wavelength. The two-dimensional photonic crystal waveguide can maintain a large $n_g$ in a wider wavelength range as compared with the one-dimensional photonic crystal waveguide.

FIG. 5D is a perspective view showing a two-dimensional photonic crystal waveguide sandwiched between silica claddings. In this configuration example, a surface diffraction grating to be the second periodic structure is formed on the surface of the two-dimensional photonic crystal waveguide in which the silica claddings are formed. The level of coupling between the two-dimensional photonic crystal waveguide and the surface diffraction grating can be changed by adjusting the thickness of the cladding therebetween, so that light can be emitted at an appropriate speed.

Slow Light Emission Condition

Figure 6A:
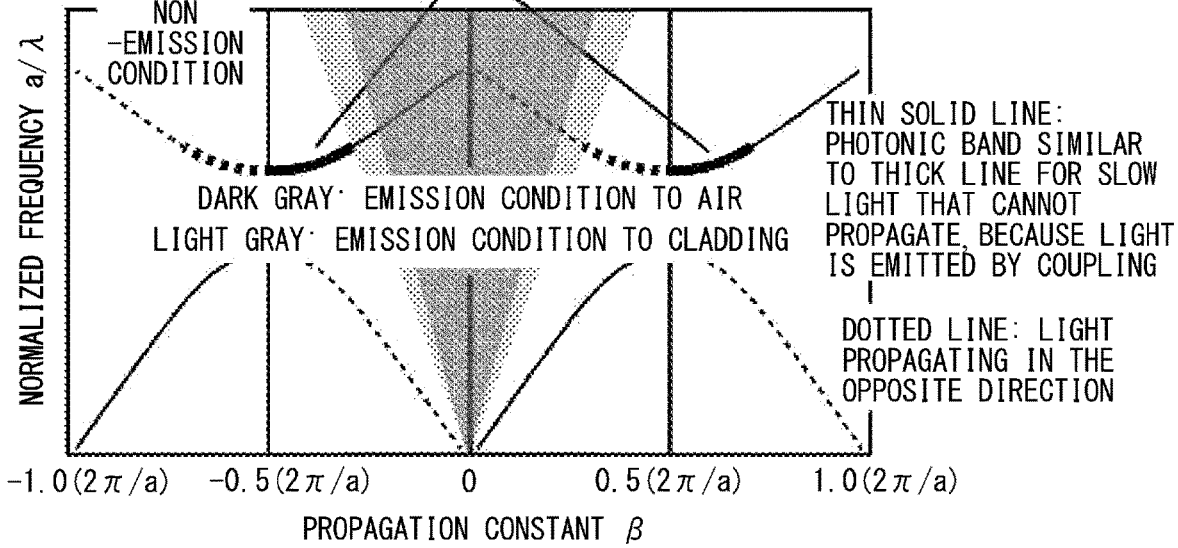
FIGS. 6A and 6B is a diagram for describing a emission condition of slow light.

Hereinafter, the emission condition of the slow light with the periodic structure will be described. FIG. 6A is a diagram for describing the emission condition with the first periodic structure, and shows photonic bands with only the first periodic structure.

In FIG. 6A, the darker area shows the emission condition to the air, and the thinner area shows the emission condition to the cladding. The thick solid lines indicate photonic bands of slow light that is coupled to the first periodic structure and propagates in a non-radiative manner in a positive direction, and forms a waveguide mode. On the other hand, the thin solid lines show photonic bands in which the first periodic structure is coupled to air or the cladding, and slow light cannot propagate by the emission. The broken lines indicate light propagating in the opposite direction.

In the configuration having only the first periodic structure shown in FIG. 6A, the light propagates without being emitted within the range of the propagation constant indicated by the thick solid lines in FIG. 6A, the light is emitted in the air within the range of the propagation constant indicated by the darker area, and the light is emitted in the cladding within the range of the propagation constant indicated by the thinner area.

Figure 6B:
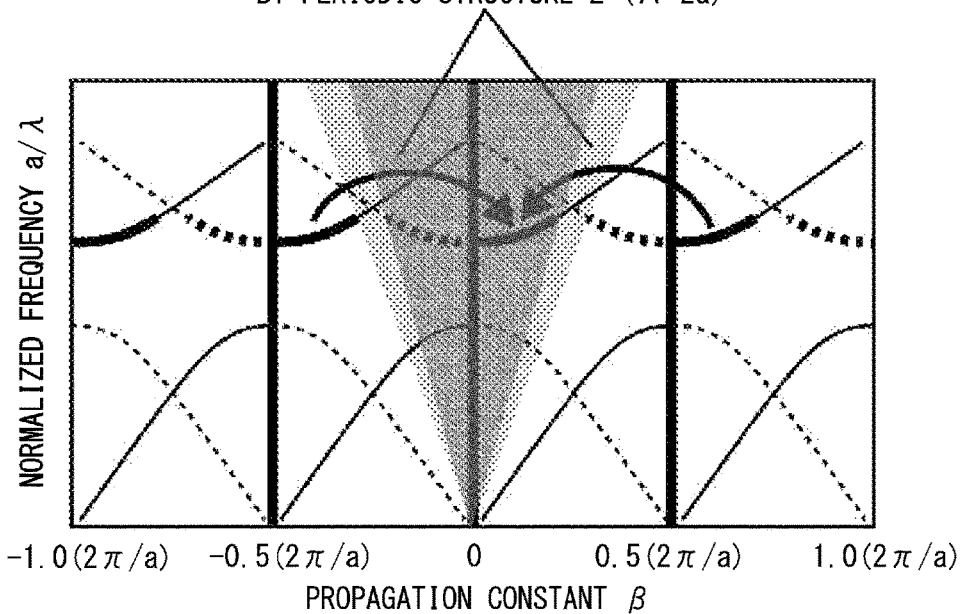

Second Periodic Structure and Emission Mode:

The period Λ of the second periodic structure can have various values, but is typically, Λ=2a. FIG. 6B shows the photonic bands when the period Λ of the second periodic structure is 2a. In this periodic structure, the wavenumber in the waveguide mode is converted into the emission condition in the emission mode region by a band shift of the wavenumber vector 2π/Λ of the second periodic structure, and the light is converted into light emitted in the same obliquely upward direction as the direction in which the light travels.

Therefore, in the configuration in which the period Λ of the second periodic structure is 2a, the slow light propagating through the first periodic structure is emitted to the air by the emission condition of the second periodic structure.

When the period Λ of the second periodic structure differs from the condition of Λ=2a, the light is not emitted or is emitted in a plurality of directions. The emission in the relationship between the period Λ and the period a will be described below.

(a) In the case of Λ<a:

The emission condition is not satisfied, and thus light is not emitted.

(b) Range of a<Λ<2a:

Light is emitted in an oblique direction.

(b1) In the case of Λ<4a/3:

FIG. 7A shows the case of Λ<4a/3. In this period Λ, some wavelengths do not satisfy the emission condition to the air.

(b2) In the case of Λ=*4a/3:

FIG. 7B shows the case of Λ=*4a/3. In this period Λ, all slow light modes enter the emission condition to the air, and emission at multiple angles does not occur. The slow light mode is at the edge of the negative emission condition, the emission is deflected at an angle close to horizontal in the direction opposite to the light traveling direction.

(b3) In the case of 4a/3<Λ<2a:

FIG. 7C shows a case where 4a/3<Λ<2a. In this period Λ, emission at multiple angles occurs.

(b4) In the case of Λ=2a:

FIG. 7D shows the case of Λ=2a. In this period Λ, all slow light modes are again in the emission condition, and emission at multiple angles does not occur.

(b5) In the case of Λ>2a:

FIG. 7E shows the case of Λ>2a. In this period Λ, the number of folds of the photonic band increases, and thus many emission conditions appear.

Therefore, when a single emitted beam is formed and deflected, the period Λ of the second periodic structure is in the range of a<Λ<2a:

It is preferable to satisfy the condition Λ=*4a/3 or Λ=2a.

(Deflection Angle of Emitted Beam)

Next, the maximum deflection angle obtained in a situation where the wavelength λ and the refractive index n can be sufficiently changed will be described.

According to the photonic band characteristics in FIGS. 6A to 7E, in the case of a two-dimensional photonic crystal waveguide formed of Si slabs, the photonic band in the slow light mode appears approximately at a/λ=*0.25. At this time, when the refractive index of the upper and lower claddings of Si is $n_c$, β of the slow light can have the following values.

$$\beta = (2\pi/a)N - 0.25 n_c (2\pi/a) \text{ to } (2\pi/a)N - 0.50(2\pi/a) \quad (6)$$
$$= *(4N - n_c)k_0 \text{ to } (4N - 2)k_0$$

Here, $n_c$ is the refractive index of the upper and lower cladding which determines the emission condition.

In the case of Λ=2a:

When Λ=2a, β of the slow light is converted into a wavenumber by $2\pi/\Lambda = 2\pi/2a = *2k_0$, thus it is expressed by the following formula (7).

$$\beta_N = *(4N - n_c)k_0 \text{ to } (4N-4)k_0 \quad (7)$$

Here, when N=1, which is normally used by the slow light, β and n are expressed by the following formulas (8) and (9), and the emission angle θ is expressed by the following formula (10).

$$\beta_1 = *(2 - N_C)k_0 \text{ to } 0 \quad (8)$$

$$n_N = n_1 = \beta_1/k_0 = *(2 - n_c) \text{ to } 0 \quad (9)$$

$$\theta = \sin^{-1} n_1 = \sin^{-1}(2 - n_c) \text{ to } 0 \quad (10)$$

When an air-bridge structure having an air cladding ($n_c$=1) is employed, the range of θ=90° to 0° is a deflectable range in the ideal state. When a silica cladding ($n_c$=1.45) is employed, the range of θ=33° to 0° is a deflectable range in the ideal state.

In the case of Λ=4a/3:

When Λ=4a/3, β of the slow light is converted into a wavenumber by $2\pi/\Lambda = 3\pi/2a = *3k_0$, thus it is expressed by the following formula (11).

$$\beta_N = *(4N - 3 - n_c)k_0 \text{ to } (4N-5)k_0 \quad (11)$$

When it is N=1, which is usually used for the slow light, β and n are expressed by the following formulas (8) and (9), and the emission angle θ is expressed by the following formula (14).

$$\beta_1 = *-(n_c - 1)k_0 \text{ to } -k_0 \quad (12)$$

$$n_N = n_1 = \beta_1/k_0 = *-(n_c - 1) \text{ to } -1 \quad (13)$$

$$\theta = \sin^{-1} n_1 = \sin^{-1}[-(n_c - 1)] \text{ to } -1 \quad (14)$$

In the air cladding, θ=0° to -90°, while in the silica cladding, θ=-27° to -90°.

[Change in Wavelength and Refractive Index Required for Deflection]]

The wavelength range satisfying the propagation condition of the slow light is, when the photonic crystal waveguide has an air-bridge structure, about 35 nm in the vicinity of λ=*1550 nm, and for the silica cladding, it is about 15 nm. In these ranges, the maximum beam deflection as described above is achieved.

These variable wavelengths are achieved in a desktop variable wavelength laser apparatus and a variable wavelength laser compact module.

On the other hand, in order to change the angular range of deflection by fixing the wavelength λ and changing the refractive index n, the angular range is changed by a change in the propagation constant β when the band shifts to the frequency direction (which may also be referred to as a wavelength direction). A change in the refractive index n corresponding to the change in the wavelength by 35 nm is 0.085, for example, when Si is used as a material. This change in the refractive index can be achieved by heating at about 470 degrees Celsius. Further, a change in the refractive index n corresponding to the change in the wavelength by 15 nm is 0.036. This change in the refractive index can be achieved by heating at about 200 degrees Celsius. This heating range is possible by utilizing the silicon photonics technique.

However, when the wavelength λ is changed, the group refractive index $n_g$ is small on the short wavelength side, and thus the change in the emission angle θ is small. On the other hand, the group refractive index $n_g$ is large on the long wavelength side, and thus the emission angle θ greatly changes. Even when the refractive index n is changed, it shows characteristics similar to that of the wavelength λ. For example, when the wavelength λ is fixed to the short wavelength side of the propagation band of the slow light and the refractive index n is increased, initially the group refractive index $n_g$ is small and the variation of the emission angle θ is small. However, the group refractive index $n_g$ gradually increases, the change in the emission angle θ also increases.

The change in the emission angle θ with respect to the wavelength λ and the refractive index n is thus nonlinear. However, when the group refractive index $n_g$ is constant with respect to the wavelength λ or the refractive index n, the change in the emission angle θ becomes close to linear. In the case of a two-dimensional photonic crystal waveguide, the group refractive index $n_g$ can be set to a large constant value within a specific wavelength range.

Figure 8:
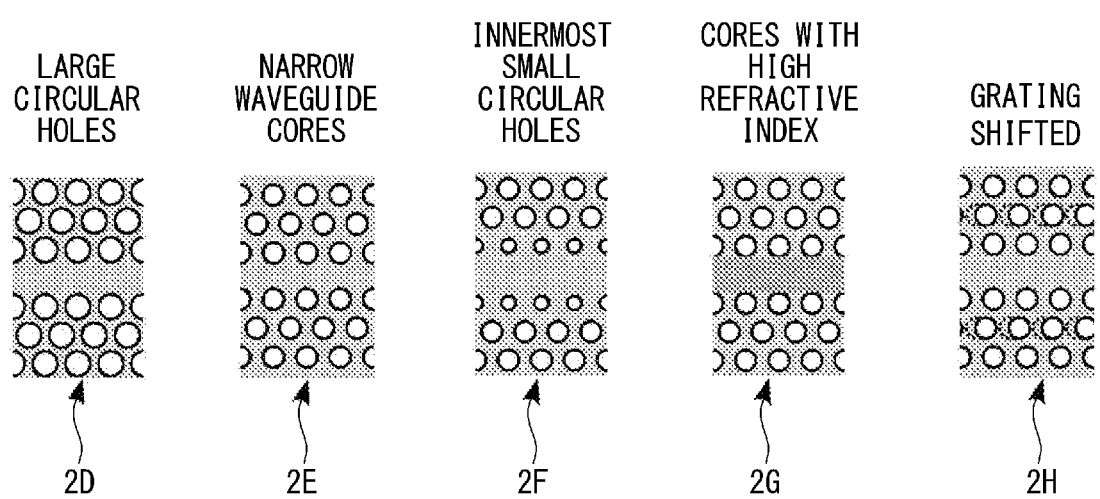
FIG. 8 is a diagram for describing configuration examples of an optical waveguide part of the optical deflection device according to the present invention.

FIG. 8 shows a configuration example in which the group refractive index $n_g$ can have a constant value. A two-dimensional photonic crystal waveguide 2D shows a configuration example in which the circular holes are excessively enlarged. A two-dimensional photonic crystal waveguide 2E shows a configuration example in which the width of the core of the optical waveguide part is narrowed. A two-dimensional photonic crystal waveguide 2F shows a configuration example in which the size of the circular holes in specific rows is changed. A two-dimensional photonic crystal waveguide 2G shows a configuration example in which only the refractive index of the core is increased. A two-dimensional photonic crystal waveguide 2H shows a configuration example in which specific rows of circular holes (lattice) position are shifted.

Figure 9A:
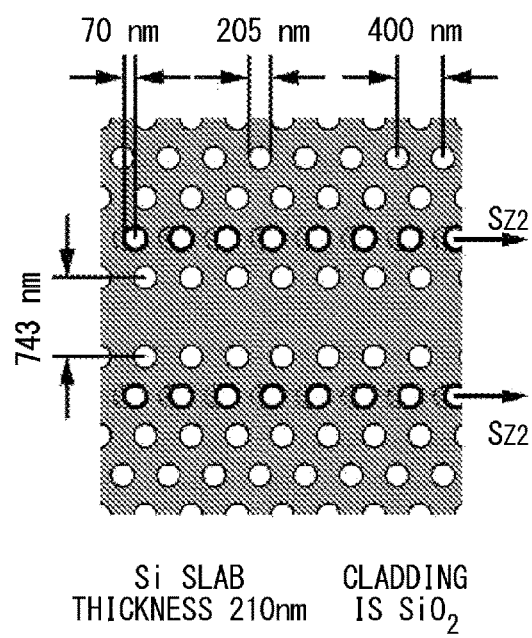
FIGS. 9A and 9B are diagrams for describing a configuration example of an optical waveguide part of the optical deflection device according to the present invention.
Figure 9B:
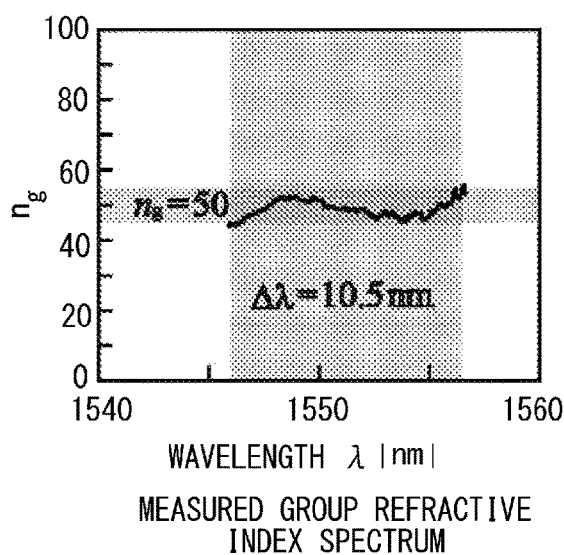

FIG. 9A shows a configuration in which circular holes in second rows in a grating of a silica cladding photonic crystal waveguide are shifted along a waveguide. FIG. 9B shows an experimentally measured group refractive index spectrum. In this group refractive index spectrum, the group refractive index $n_g$ is substantially constant at $n_g=50$ within the range of about 10 nm at around the wavelength 1550 nm.

The group refractive index $n_g$ is 12 times greater than the group refractive index $n_g$ of the thin Si line waveguide. In the section where the group refractive index $n_g$ is constant, the emission angle $\theta$ linearly changes with respect to the wavelength $\lambda$ and the refractive index n. Thus, the emission angle $\theta$ can be easily controlled.

At this time, $a/\lambda$ and $\beta$ are calculated by the following formulas.

$$a/\lambda = *0.258$$

$$\beta = 0.55(2\pi/a) \text{ to } 0.63(2\pi/a) = *2.13k_0 \text{ to } 2.44k_0$$

When the period $\Lambda$ of the second periodic structure is $\Lambda=4a/3=*0.344\lambda=533$ nm ($\lambda=1550$ nm), a refractive index $n_1$ and the emission angle $\theta$ are the following values.

$n_1=-0.87$ to $-0.56$
$\theta=-60°$ to $-34°$

In this case, when the period $\Lambda$ is made slightly smaller than $4a/3$, a large deflection angle can be obtained. When $\Lambda=1.24a$, the propagation constant $\beta$ of the slow light is converted into a wavenumber as follows.

$$\pi/\Lambda = (2\pi/\lambda)(\lambda/a)(a/\Lambda) = 2.13+1$$

The values of the refractive index $n_1$ and the emission angle $\theta$ are shown below.

$n_1=-1$ to $-0.69$
$\theta=-90°$ to $-44°$

In this case, it is possible to achieve the range of deflection angle $90-44=46°$ only by changing the wavelength within the range of 10 nm at around the wavelength of 1550 nm.

The slow light waveguide may be, in addition to a photonic crystal waveguide, a coupled resonator waveguide composed of a number of photonic crystal resonators or ring resonators coupled to one another. Further, the slow light waveguide can be applied to a configuration that combines a laminated waveguide including a multilayer film formed in the layer thickness direction with one of the layers being thick so as to be a waveguide with a photonic crystal waveguide.

(Diffraction Grating)

Next, a configuration example of the diffraction grating will be described with reference to FIG. 10.

The diffraction grating constituting the emission part 3 having the second periodic structure can have a structure other than the surface diffraction grating.

Figure 10:
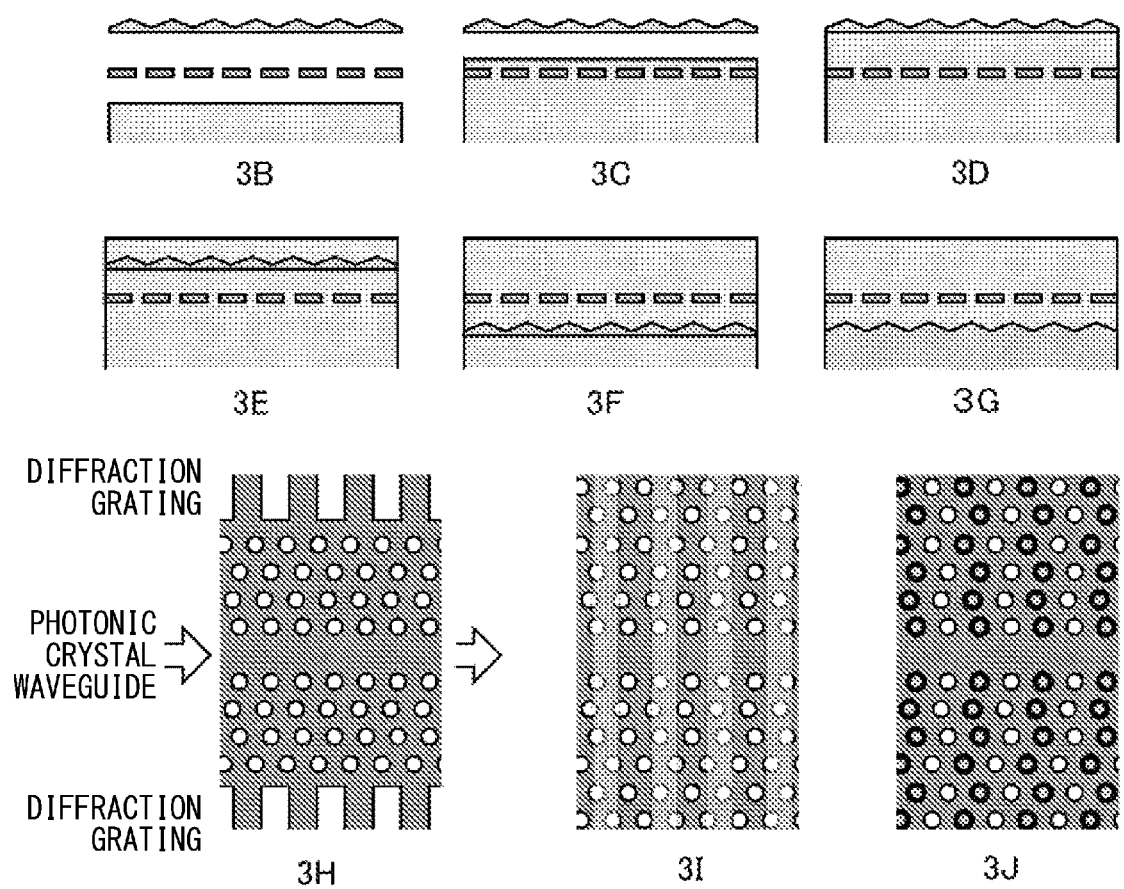
FIG. 10 is a diagram for describing configuration examples of an emission part of the optical deflection device according to the present invention.

In FIG. 10, an air-bridge diffraction grating 3B is a configuration example in which a diffraction grating is disposed on an air-bridge slow light waveguide with an air layer interposed therebetween. An air-bridge diffraction grating 3C is a configuration example in which a diffraction grating is disposed on a cladding embedded slow light waveguide with an air layer interposed therebetween. A diffraction grating 3D is a configuration example in which a recessed and projected layer having a refractive index (such as SiN) different from that of the upper cladding is disposed on the upper cladding of the slow light waveguide to form a diffraction grating. A diffraction grating 3E is a configuration example in which a recessed and projected diffraction grating is embedded in a layer (such as SiN) having a refractive index different from that of the upper cladding in the upper cladding. A diffraction grating 3F is a configuration example in which a recessed and projected diffraction grating is embedded in a layer (such as SiN) having a refractive index different from that of the lower cladding in the lower cladding. A diffraction grating 3G is a configuration example in which a recessed and projected shape is directly etched in a layer (such as an Si substrate) below the lower cladding.

A diffraction grating 3H is a configuration example in which recessed and projected shapes are formed at both ends of a photonic crystal waveguide. In the photonic crystal waveguide, a finite number of circular holes are arranged in both sides of the waveguide core. In this configuration example, a diffraction grating is formed at a place where light leaks out in order to radiate the light, because when the number of rows of the circular holes is reduced, the light leaks to the outside.

A diffraction grating 3I is a configuration example in which a shallow recessed and projected shape is formed on a surface of a photonic crystal waveguide. The diffraction grating may be a normal one-dimensional periodic structure, include photonic crystals having different hole arrangement periods, or shallow recesses and projections having different periods from one another may be directly formed on the photonic crystal waveguide.

A diffraction grating 3J is a configuration example in which another period is overlapped on the period of the photonic crystal, so that the photonic crystal will be a multi-periodic structure.

A configuration example in which the photonic crystal is a multi-periodic structure is composed of one mechanism including a waveguide and a light emission mechanism using a photonic crystal waveguide as a slow light waveguide. In the photonic crystal waveguide, a waveguide is formed by sandwiching it between photonic crystals in which circular holes are arranged on left and right sides of the waveguide to reflect and propagate the light.

The optical deflection device having a multi-periodic structure includes a double periodic structure. In the double periodic structure, two types of circular holes with different diameters are repeated along a waveguide in a plane of a photonic crystal.

In the example of the diffraction grating shown in FIG. 10, the recessed and projected shape is drawn in a shape of mountains, but it is not limited to this mountain shape and may be any shape.

Figure 11:
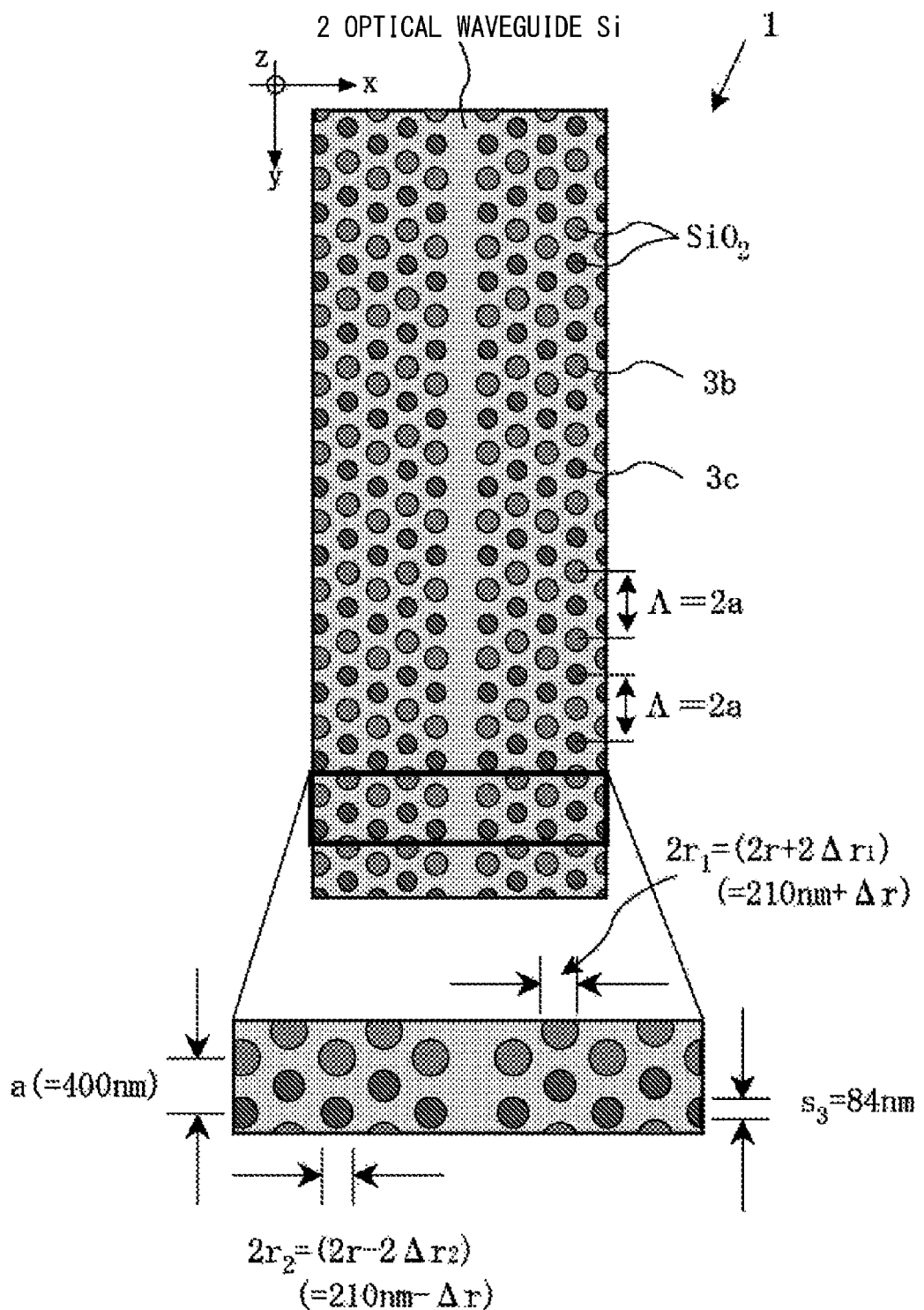
FIG. 11 is a diagram for describing a configuration of the optical deflection device according to the present invention having a multi-periodic structure.

FIG. 11 is a diagram for describing a configuration of an optical deflection device having the multi-periodic structure of 3J in FIG. 10.

In the optical deflection device 1, circular holes 3b and 3c of a low refractive index medium such as $SiO_2$ are two-dimensionally periodically arranged in, for example, a triangular lattice in a slab formed of a high refractive index medium such as a semiconductor of Si or the like with some of the circular holes in the arrangement being removed. The part from which the circular holes are removed constitutes a waveguide part by a two-dimensional photonic crystal and also constitutes an emission part for radiating a emitted light beam.

The optical deflection device 1 includes a double periodic structure 4 in which circular holes 3b and 3c having two different diameters $2r_1$ and $2r_2$, respectively, are repeated in the light propagation direction. In the double periodic structure 4, the slow light propagated light, which is not emitted in the periodic structure in which circular holes having the same diameter are arranged, is converted into the emission condition and emitted to the space.

The double periodic structure included in the optical deflection device includes a periodic structure in which circular holes having large diameters are repeated and a periodic structure in which circular holes having small diameters are repeated. When the diameter of a reference circular hole is 2r and a difference between the diameters of the holes is $2\Delta r$, the diameter $2r_1$ of the large diameter circular hole is $2(r+\Delta r)$, and the diameter $2r_2$ of the small diameter circular hole is $2(r-\Delta r)$. Further, when the distance between the centers of the adjacent large diameter circular hole 3b and the small diameter circular hole 3c is a, the distance $\Lambda$ between the circular holes of each of the periodic structures is 2a.

Examples of the sizes in the optical deflection device 1 are, for example, a=400 nm and 2r=210 nm, and a distance $s_3$ between the adjacent circular hole 3b and circular hole 3c is 84 nm. These sizes are merely examples, and they are not limited to these values.

Further, the configuration example of the optical deflection device shown in FIG. 11 may employ a configuration of a device using a third row shifted silica cladding SiLSPCW or a second row shifted LSPCW. An increase in the light deflection angle $\Delta\theta$ can be expected with the second row shifted LSPCW having a large ng.

Figure 12A:
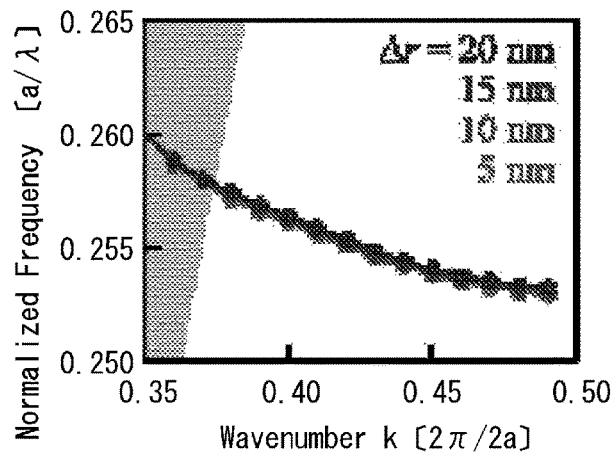
FIGS. 12A to 12D are diagrams showing photonic bands, a group refractive index $n_g$ spectrum, a emission angle $\theta$ with respect to a wavelength $\lambda$, and a emission loss $\alpha$ with respect to the wavelength $\lambda$ of the optical deflection device according to the present invention.
Figure 12B:
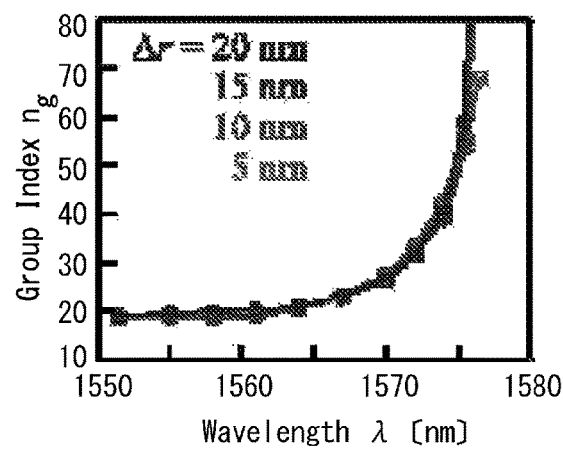
Figure 12C:
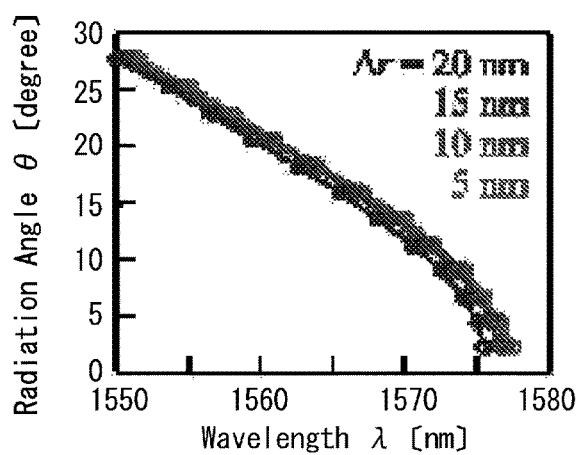

FIGS. 12A to 12D show the photonic band, the group refractive index $n_g$ spectrum, the emission angle $\theta$ with respect to the wavelength $\lambda$, and the emission loss $\alpha$ with respect to the wavelength $\lambda$ in the optical deflection device having the multi-periodic structure according to the present invention. The emission angle $\theta$ in FIG. 12C is set to $\theta=0°$ in the vertical direction of the plane (the z direction in FIG. 11).

In FIG. 12A, in the optical deflection device according to the present invention having the double periodic structure, the photonic band representing the light propagation characteristic does not change even when the diameter r of the circular hole changes by $2\Delta r$ in a manner similar to when the diameter of the circular hole is constant at 2r. As shown in FIG. 12B, the group refractive index $n_g$ does not change with respect to a change in the diameter $\Delta r$, indicating that slow light with low dispersion occurs in a wide band with $n_g$ being approximately 20. The light propagation characteristic indicates that the propagation constant $\beta$ does not change with respect to the propagation direction of the light, and as shown in FIG. 12C, the angle $\theta$ of the emitted light does not change.

On the other hand, in FIG. 12B, the emission loss $\alpha$ of the light can be changed by changing the diameter 2r of the circular hole by $\Delta r$. FIG. 12B shows an example in which $\Delta r$ is 5 nm, 10 nm, 15 nm, and 20 nm, and shows that the emission loss a increases as $\Delta r$ increases. The emission loss $\alpha$ represents a rate at which the propagated light leaks out of the plane from the optical transport path. The greater $\Delta r$ is, the greater the intensity of the emitted light beam emitted out of the plane becomes.

The emission angle $\theta$ with respect to the wavelength $\lambda$ shown in FIG. 12C reflects the photonic band, and thus $\Delta r$ dependency is small. The light deflection angle $\Delta\theta$ of nearly 30° with respect to the wavelength change $\Delta r$=27 nm can be achieved by the slow light effect and refraction at a boundary surface between the silica cladding and air, which is not shown in FIG. 12C.

Figure 12D:
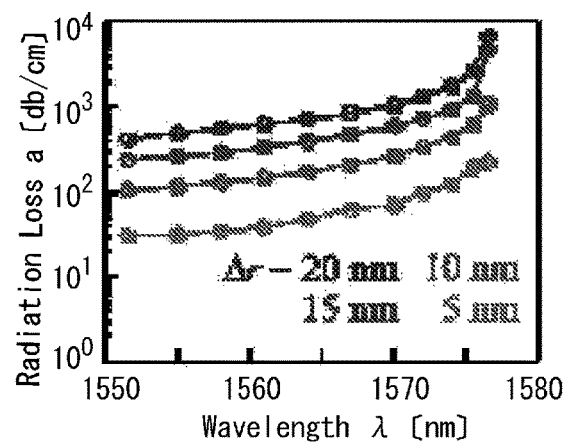

When the second row shifted LSPCW having a large ng is used, the emission loss $\alpha$ with respect to the wavelength $\lambda$ shown in FIG. 12D can be further increased. On the other hand, the emission loss $\alpha$ increases as $\Delta r$ increases. Therefore, the controlling $\Delta r$ enables control on the amount of light emission, which does not significantly change other properties such as the emission angle and propagation constant in the propagation direction.

(Configuration for Adjusting Deflection Angle)

Hereinafter, a configuration for adjusting the deflection angle of the emitted beam will be described with reference to FIGS. 13A to 14B.

Figure 13A:
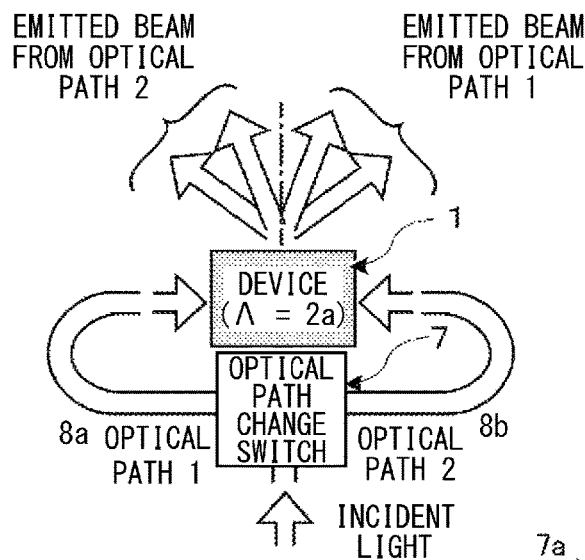
FIGS. 13A to 13C are diagrams for describing configuration examples for expanding an emission angle of the optical deflection device according to the present invention.
Figure 13B:
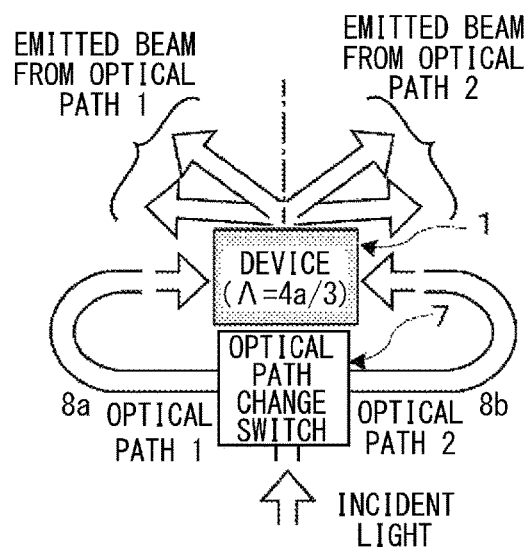
Figure 13C:
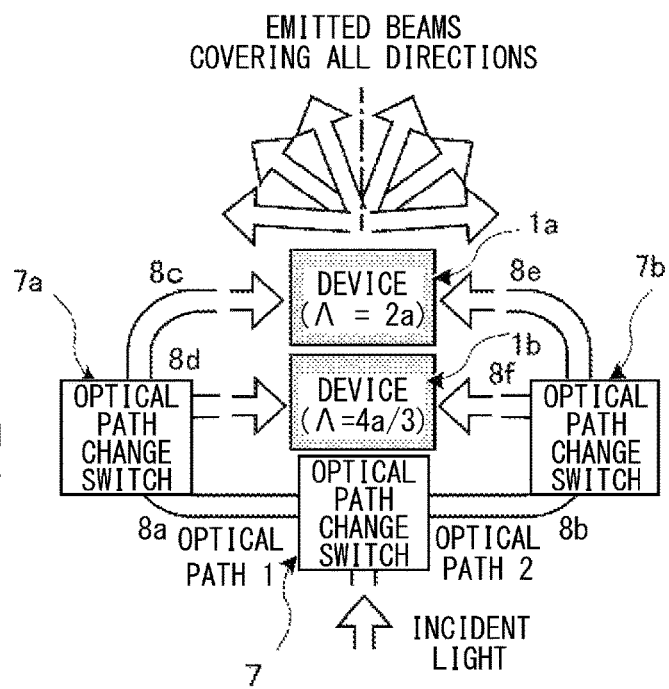

Configuration for Expanding the Range of Deflection Angle:

FIGS. 13A to 13C show configuration examples in which the range of the deflection angle is expanded by switching the incident direction of the incident light entering the optical deflection device.

When there is a relationship of $\Lambda=2a$ between the period a of the first periodic structure and the period $\Lambda$ of the second periodic structure, the deflection angle $\theta$ of the emitted beam (emission angle) $\theta$ is 0° or greater. When the direction of the light incident to the optical deflection device is configured to become the opposite direction, the emission direction of the emitted beam becomes symmetrical. Therefore, the range of the deflection angle can be expanded within the range of ±90° or ±33° with reference to 0° by switching the direction in which the light is incident by the optical path change switch 7.

In FIG. 13A, optical paths 8a and 8b are connected to the both input ends of the optical deflection device 1. The optical path change switch 7 switches the incident light to the optical path 8a or the optical path 8b. In the optical deflection device 1, light whose incident direction is switched from the optical path 8a or the optical path 8b is incident on the optical deflection device in directions opposite to each other.

The configuration example shown in FIG. 13B shows a case where $\Lambda=4a/3$ in the same configuration as that shown in FIG. 13A. In this case, the deflection angle (emission angle) $\theta$ of the emitted beam is deflected at around −90°. The deflection is at around 90° for incidence in the opposite direction. Therefore, the emitted beam has a deflection angle range in both positive and negative directions with respect to 0°.

In the configuration example shown in FIG. 13C, optical paths are switched by the optical path change switches 7, 7a, and 7b, so that the incident light is incident on two optical deflection devices 1a and 1b.

An optical path 8c is connected to one incident end of the optical deflection device 1a via optical path change switches 7 and 7a, and an optical path 8e is connected to the other incident end of the optical deflection device 1a via optical path change switches 7 and 7b. Further, an optical path 8d is connected to one incident end of the optical deflection device 1b via optical path change switches 7 and 7a, and an optical path 8f is connected to the other incident end of the optical deflection device 1b via optical path change switches 7 and 7b. The optical path change switch 7 is connected to the optical path change switch 7a by the optical path 8a, and the optical path change switch 7 is connected to the optical path change switch 7b by the optical path 8b.

In this configuration, the light can be deflected in all directions by switching the optical paths to the optical deflection devices 1a and 1b by the optical path change switches 7, 7a, and 7b.

Configuration to Prevent Light from Spreading

Figure 14A:
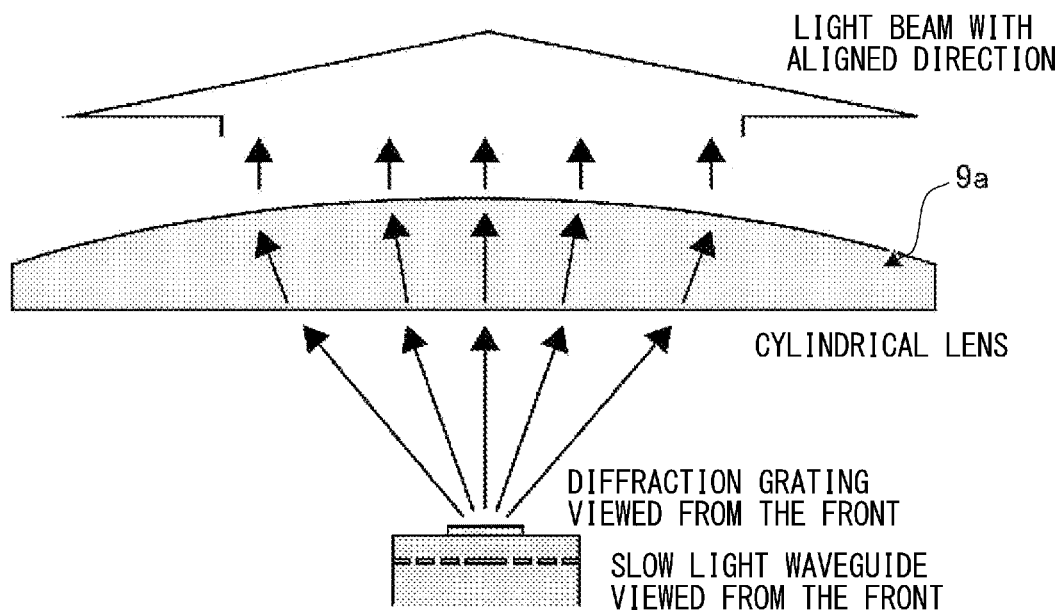
FIGS. 14A and 14B are diagrams for describing configuration examples for expanding an emission angle of the optical deflection device according to the present invention.
Figure 14B:
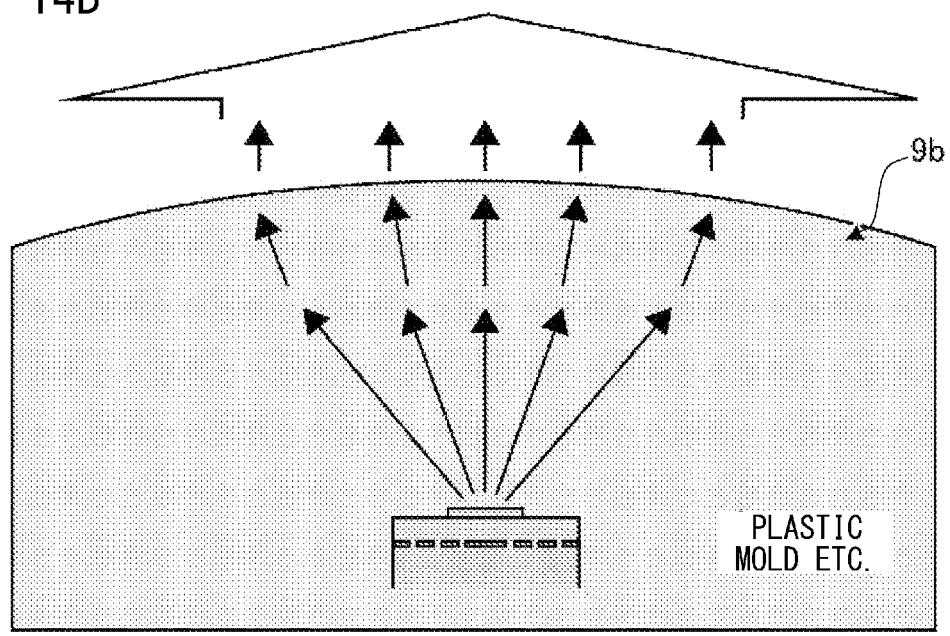

FIGS. 14A and 14B show configurations for effectively preventing the spreading of the light emitted from the optical deflection device via an optical system lens.

The light beam emitted from the emission part 3 of the optical deflection device 1 becomes sharp when the waveguide is viewed from the side along the light propagation direction. However, such a light beam greatly spread vertically when the waveguide is viewed in its cross section perpendicular to the light propagation direction. In FIG. 14A, a cylindrical lens 9a is disposed at an appropriate distance on the emission side of the emission part 3 to effectively prevent the light from spreading. The cylindrical lens 9a has a uniform thickness in the direction along the waveguide and has a curved shape with its thickness changing in a direction perpendicular to the waveguide. Such a shape effectively prevents the light emitted from the emission part 3 from spreading vertically, whereby a single peak beam is produced. In the configuration shown in FIG. 14B, a slow light waveguide is embedded in an optical member such as a plastic mold 9b, and cylindrical lens processing is performed on a surface of the optical member. The configuration shown in FIG. 14B achieves the same effect as that of the cylindrical lens of FIG. 14A.

The cylindrical lens may be mounted in the upper part of the optical deflection device or a thick $SiO_2$ cladding or polymer cladding may be formed in the upper part of the optical deflection device and the surface of this cladding may be processed into a lens shape.

(Configuration for Two-Dimensional Scanning)

Hereinafter, a configuration for two-dimensionally scanning emitted beams will be described with reference to FIGS. 15A to 16B.

Figure 15A:
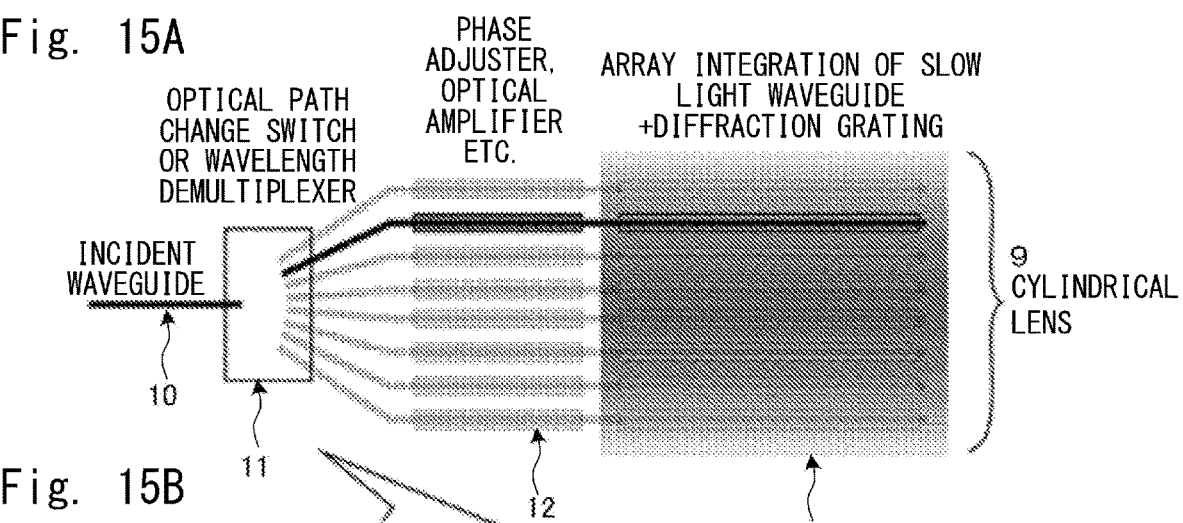
FIGS. 15A to 15C are diagrams for describing configuration examples of two-dimensional beam scanning of the optical deflection device according to the present invention.
Figure 15B:
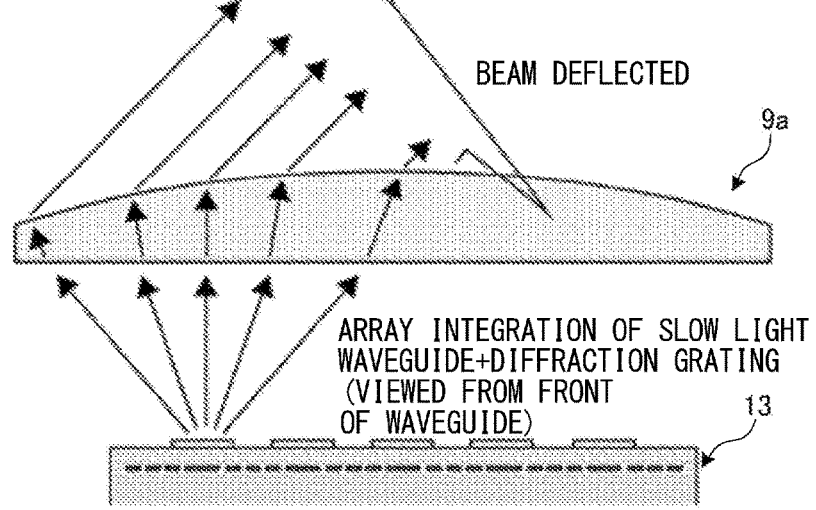

Combination of Array Configuration and Cylindrical Lens:

FIGS. 15A and 15B show configuration examples in which two-dimensional beam scanning is performed by a combination of an array configuration of a slow light waveguide and a cylindrical lens.

In FIG. 15A, many slow light waveguides and diffraction gratings are arranged in parallel to form an array integration 13, and a cylindrical lens 9 is disposed in the direction of emission on the emission side of the array integration 13. An optical amplifier and a phase adjuster 12 are connected to each slow light waveguide. A switching unit 11 is connected to the phase adjuster 12. A switching unit 11 is connected to the phase adjuster 12. The switching unit 11 selects the slow light waveguides which incident light from the incident waveguide 10 enter. After the phase is adjusted by the phase adjuster 12, the light enters the selected slow light waveguide. An optical path change switch or a wavelength demultiplexer may be used as the switching unit 11.

When one of the slow light waveguides is selected by the switching unit 11, the incident light entering from the incident waveguide 10 is emitted from one of the slow light waveguides. At this time, as shown in FIG. 15B, a relative position of the emitted beam to the cylindrical lens 9a changes, and thus the angle of the emitted beam emitted from the cylindrical lens 9a changes in a cross section.

When the waveguide is thin, the spread of the emitted light becomes particularly large. In such a case, the same function as that shown in FIG. 15B can be achieved by the configuration shown in FIG. 15C. Specifically, first a small cylindrical lens array 9c is disposed on each of the diffraction gratings to effectively prevent the emitted light from spreading, and then the light is made incident on a large cylindrical lens 9a.

This configuration is designed in such a way that each of the slow light waveguides can change the emission angle θ of the emitted beam according to the wavelength by continuously scanning the wavelength of the incident light over a wide range and the wavelength demultiplexer sequentially switching the waveguides or by the optical path change switch sequentially switching the waveguides for light having a wavelength changing in a time-series manner. This configuration achieves the two-dimensional scanning of the angle of the light beam.

Figure 15C:
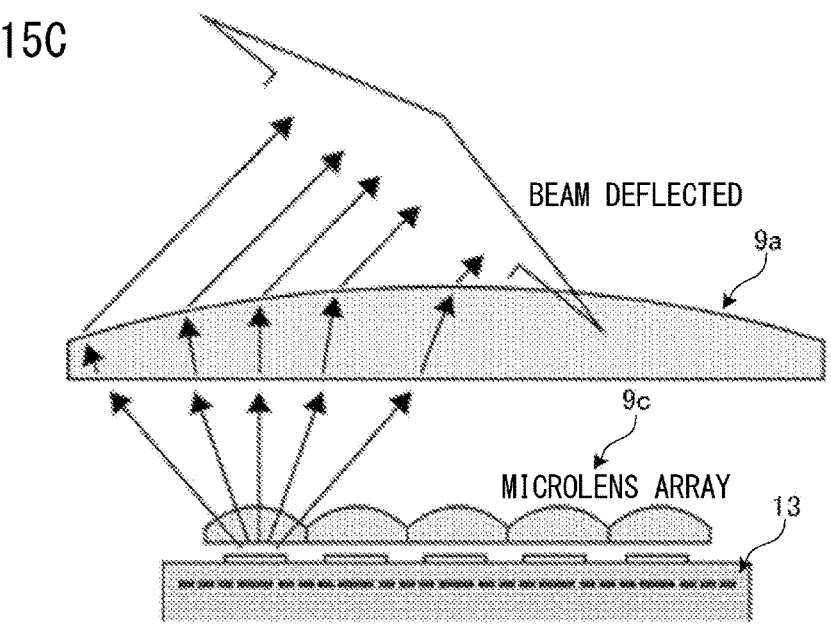

An effect similar to that shown in FIG. 15C can be achieved also by, instead of scanning the wavelength of the incident light, an optical switch, which is composed of a heater or a p-n junction, switching the waveguides and changing the emission angle θ of the emitted beam emitted from the slow light waveguide by a heater or an p-n junction.

In addition to the configuration in which the slow light waveguides are switched by a wavelength demultiplexer, and the emitted beam is deflected by a heater or a p-n junction, a configuration in which the slow light waveguides are switched by a heater or a p-n junction, and the emitted beam is deflected by a wavelength multiplexer may be employed.

FIG. 15A shows a configuration for selecting one waveguide from the waveguide array. On the other hand, in the configuration example shown in FIGS. 16A and 16B, the phase adjuster 12 is connected to an array integration 15, in which heaters and p-n junctions having lengths different from one another are provided, that is arranged in an array, so that the incident light from the incident waveguide 10 is distributed to the respective waveguides via a power distributor 14. The phases of the distributed light are adjusted, and then the light enters the slow light waveguide.

The array integration 15 constitutes a phase array in which light is incident on all slow light waveguides and provided with gradually different phase changes. This configuration achieves sharp beam emission and a change in the deflection angle by a phase change. In this phase array configuration, a plurality of light beams having phases different from one another are simultaneously emitted to thereby form an emitted beam. Thus, this phase array configuration does not need a cylindrical lens.

Figure 16A:
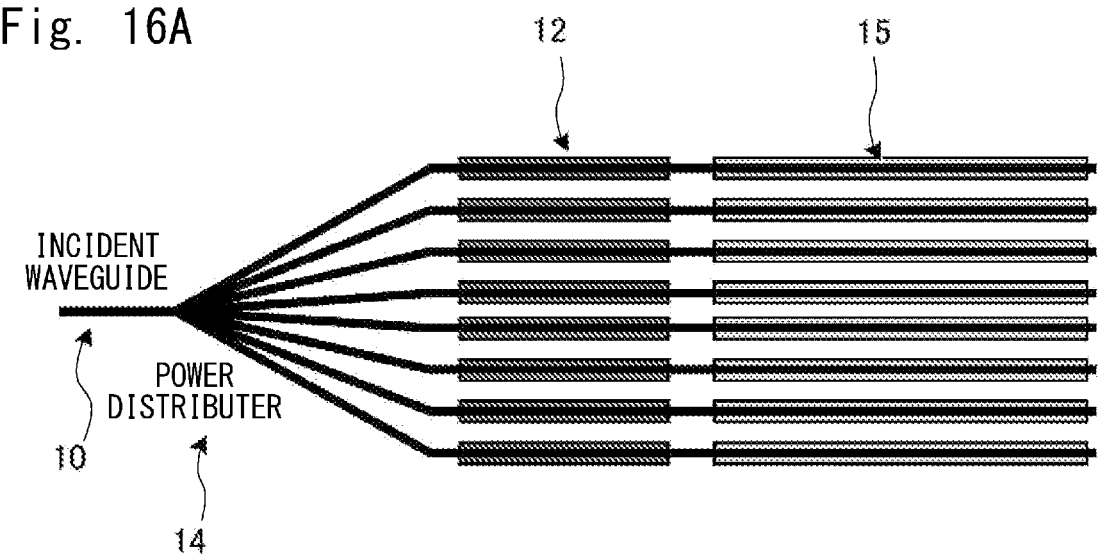
FIGS. 16A and 16B are diagrams for describing a configuration example of two-dimensional beam scanning of the optical deflection device according to the present invention.
Figure 16B:
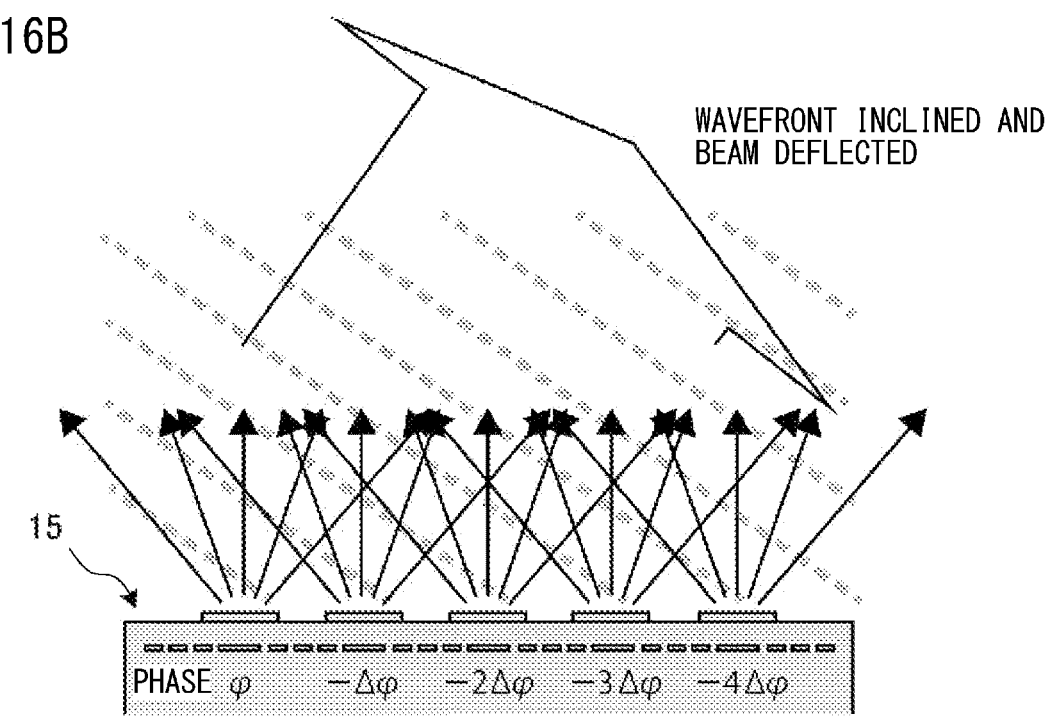

The quality of the emitted beam formed after being emitted particularly improves when the power distribution of the incident light in FIG. 16A is configured in such a way that the central waveguide has the highest power, and the farther the waveguide is from the central waveguide, the less power the surrounding waveguides has, so that an envelope curve of the power distribution shows a Gaussian distribution. A configuration example of such a distribution may be a configuration used for an arrayed waveguide diffraction grating. Specifically, an incident waveguide is connected to a wide slab waveguide, light is made to freely propagate inside the slab waveguide so as to form a Gaussian distribution, and a desired number of array waveguides are connected to an end of the slab waveguide.

(Apparatus Configuration Using Reflected Light)

The optical deflection device for radiating the light beam can be applied to an apparatus using reflected light. FIG. 17 is a diagram for describing an application of the optical deflection device to an apparatus using the reflected light.

Figure 17A:
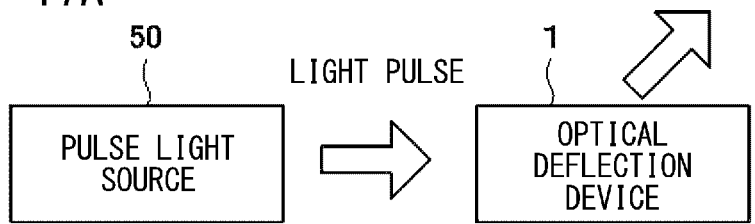
FIGS. 17A to 17C are diagrams for describing an application of the optical deflection device according to the present invention to an apparatus using reflected light.
Figure 17B:
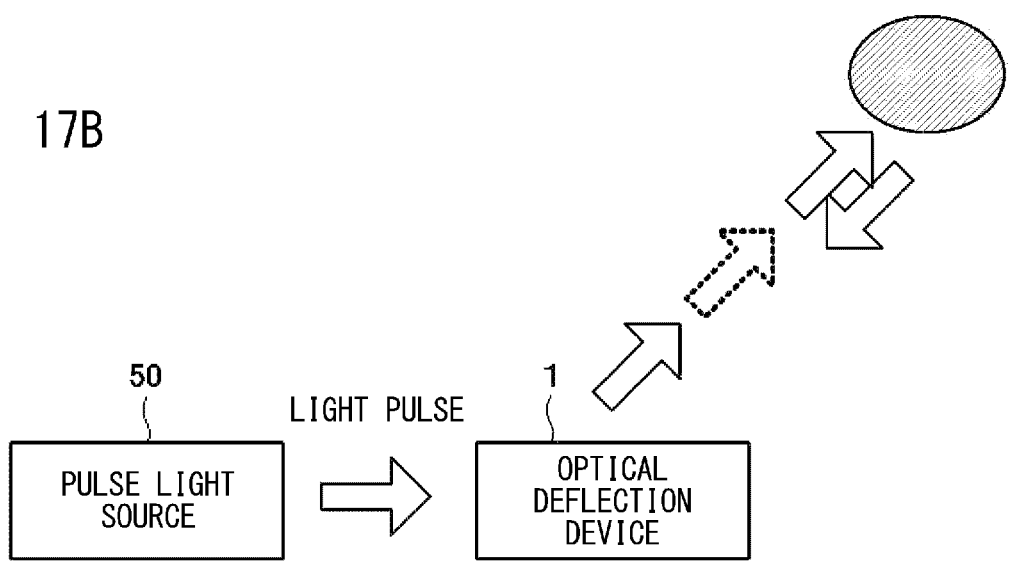
Figure 17C:
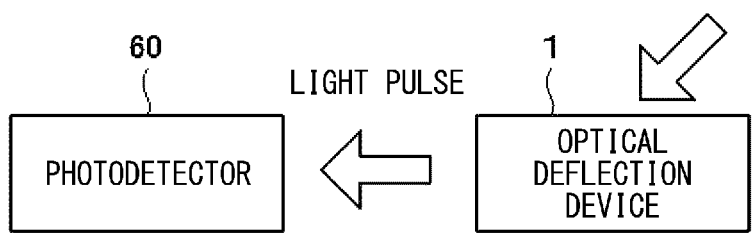

A short optical pulse is incorporated into the optical deflection device 1, and a light beam is emitted by the diffraction grating (FIG. 17A). When the emitted beam is reflected in the distance and returns to the same diffraction grating (FIG. 17B), it can return to the original waveguide by following the path in the direction opposite to the path when it is emitted. The light can be detected by a photodetector 60 of a photodiode formed of Si, Ge, or a hybrid integrated III-V semiconductor disposed at an end of the waveguide which the light returns. The configuration for receiving this reflected light is effective for applications such as LIDAR (lidar apparatus) in which a short pulse light beam is deflected to irradiate a distant object, and the reflected light is detected to measure the distance to the object.

The configuration of the lidar apparatus using the reflected light can be in a plurality of forms. FIGS. 18A to 18D are diagrams for describing forms of the lidar apparatus.

Figure 18A:
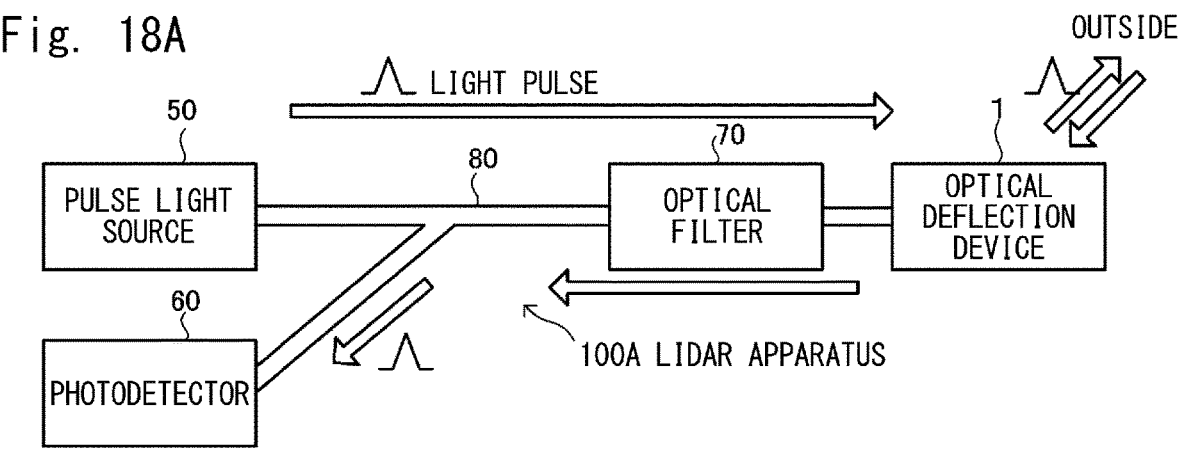
FIGS. 18A to 18D are diagrams for describing forms of a lidar apparatus according to the present invention.

FIG. 18A shows a first form. In a lidar apparatus 100A of the first form, an incident waveguide 80 is split, and the photodetector 60 (photodiode) is disposed at one end of the split path. The optical pulse reflected and returned to the optical deflection device 1 is made to pass through an optical filter 70, and then guided to the photodetector 60 via the split path to be detected.

Figure 18B:
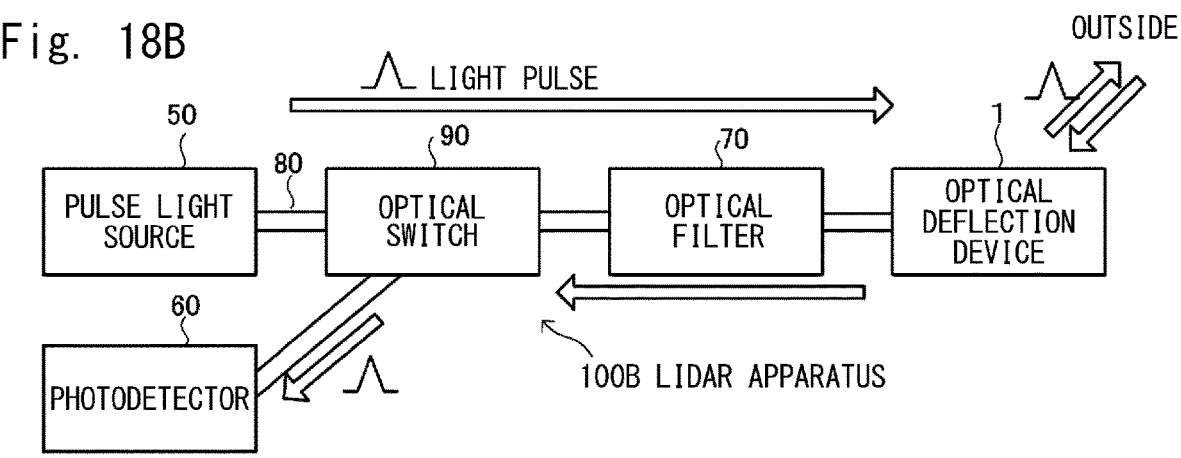

FIG. 18B shows a second form. In a lidar apparatus 100B of the second mode, an optical switch 90 is inserted into the incident waveguide 80. After an optical pulse from the pulse light source 50 passes through the optical switch 90, the path is switched to the side of the photodetector 60 (photodiode), and the reflected and returned optical pulse is efficiently guided to the photodetector 60 (photodiode).

Figure 18C:
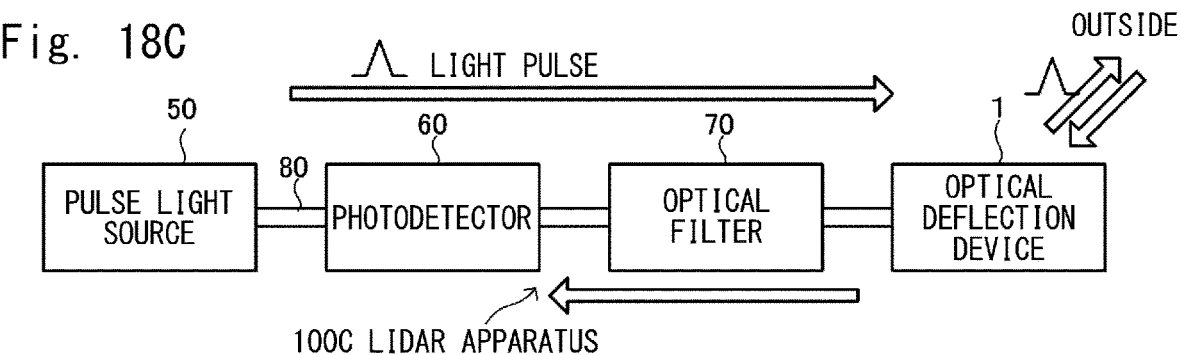

FIG. 18C shows a third form. When a strong reverse bias is applied to a photodiode, in which a p-n junction is formed in a Si waveguide, sub bandgap absorption via a crystal defect occurs, thereby enabling light in a long wavelength band, which cannot normally be detected, to be detected. In a lidar apparatus 100C of the third form, the above-mentioned photodiode having a p-n junction formed therein is inserted into the incident waveguide 80 as the photodetector 60. An optical pulse from the pulse light source 50 passes through the p-n junction, and then the p-n junction is made reverse-biased in order to detect the reflected optical pulse.

Figure 18D:
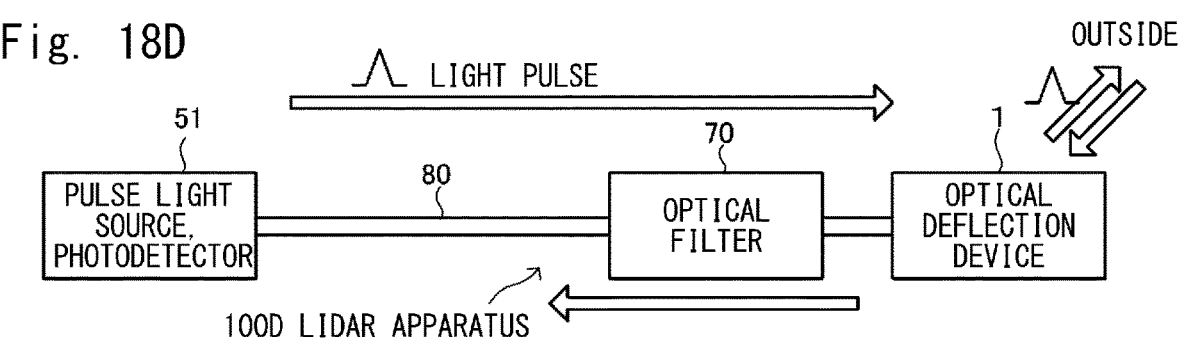

FIG. 18D shows a fourth form. A lidar apparatus 100D of the fourth form includes a pulse light source/photodetector 51 serving as a pulse light source and a photodetector. The pulsed light source/photodetector 51 can also operate as a photodiode when a reverse bias is applied to a semiconductor laser as a pulse light source. In this configuration, after the pulse light source/photodetector 51 emits an optical pulse, a reverse bias is applied to make the pulse light source/photodetector 51 operate as a photodiode to detect the reflected and returned optical pulse.

In the apparatus configuration of the lidar apparatus according to the above respective forms, even when light having the same wavelength as that of the pulse light source arrives from another direction and enters the diffraction grating, the light is not coupled to the original waveguide and will not enter the photodetector (photodiode), because the light will not follow the path in the direction opposite to the direction when it is emitted. Therefore, the optical deflection device is effective for removing unnecessary noise components in the function of the above-described LIDAR.

In the respective forms shown in FIGS. 18A to 18D, the optical filter 70 of a wavelength filter is inserted into the incident waveguide 80. The optical filter 70 is not an indispensable component as the functions of the LIDAR. The functions of the LIDAR can be achieved even without the optical filter 70.

Hereinafter, a case in which the optical filter 70 is effective will be described. The optical filter 70 can let the wavelength of the optical pulse from the pulse light source pass therethrough. When the wavelength of the pulse light source is changed, the optical filter 70 is preferably a variable wavelength filter that can change a passing wavelength in synchronization with the change in the wavelength. In this case, the light reflected and returned passes through the optical filter 70 and reaches the photodetector (photodiode).

On the other hand, light in the environment has various wavelengths. Light having a wavelength different from the wavelength of the pulse light source arrives at the diffraction grating of the optical deflection device 1 as the noise component. When an incoming direction of light having different wavelengths is the same as that of the original light beam, the noise components with different wavelengths cannot be coupled to the optical waveguide. On the other hand, some noise components arriving at the diffraction grating from another direction can be coupled back to the optical waveguide. The optical filter can remove such noise components coupled to the optical waveguide. Removal of this noise component is effective for improving the SN ratio when a reflected signal of LIDAR is detected.

The optical deflection device according to the present invention can deflect a light beam having high directivity without using mechanical parts. This reduces a size of an optical deflector, which has been large on the order of cm, to the order of mm. The optical deflection device according to the present invention improves the reliability, reduces the power consumption, increases the operation speed, and a large change in a beam angle and large resolution points by a slight change in the wavelength or the refractive index.

The optical deflection device according to the present invention can be fabricated by silicon photonics CMOS compatible processing. A photonic crystal slow light waveguide can be formed using the silicon photonics CMOS compatible processing. This slow light waveguide can greatly change the propagation constant β within a certain wavelength range by a change in the wavelength and a change in the refractive index under external control.

A refractive index can be changed by various configurations such as a configuration in which a diffraction grating is formed on an upper surface of the $SiO_2$ cladding covering a periphery of a slow light waveguide, a configuration in which a diffraction grating is formed in an SiN intermediate layer provided in a cladding, a configuration in which a heater is formed on or inside a cladding along a slow light waveguide in such a way that the upper part of the slow light waveguide is not covered, and a configuration in which a p-n junction is formed in an Si— slab. This refractive index change structure has been proven in a photonic crystal modulator.

The slow light waveguide can be connected to a thin Si line waveguide with a low loss of 1 dB or less, and the thin Si line waveguide is optically connected to an external optical fiber with a loss of about 1.5 dB via a spot size converter.

A laser light source of fiber output is prepared outside. A desktop variable wavelength light source or a C-band ($\lambda$=1.53 to 1.565 μm) variable wavelength laser diode module can be used as the laser light source.

When high output is required for the emitted beam, the optical output can be increased in advance by a semiconductor optical amplifier or an erbium-doped optical fiber amplifier. Normally, the continuous input power resistance of a spot-size converter is about 200 mW. When it is desired to input power higher than 200 mW, an optical pulse is used. A peak power of 50 W or greater can be input to a sufficiently narrow pulse. When power higher than 50 W is needed, a GaInAsP semiconductor may be bonded to the thin Si line waveguide, the propagated light may be coupled to the GaInAsP semiconductor to operate it as a semiconductor optical amplifier in order to increase the optical power inside it.

As the mechanism for switching a large number of waveguides, for example, a 1×N change switch in which many stages of Mach-Zehnder optical switches are connected in cascade, a coupled microring resonator wavelength demultiplexer, an arrayed waveguide diffraction grating, a grating wavelength demultiplexer may be used.

An Si photonic crystal slow light waveguide using CMOS compatible processing, a change in the refractive index by a heater and a p-n junction, formation of a light beam by a diffraction grating directly formed on Si, and a change in the beam angle with respect to the wavelength have been proved.

The light used is not limited to near infrared light. However, when the optical deflection device according to the present invention is formed of a Si-related material transparent to visible light such as SiN, it can be applied to, for example, a projector, a laser display, a retina display, a 2D/3D printer, a POS, or a card reader.

Note that the present invention is not limited to the above embodiments. Various modifications can be made based on the spirit of the present invention, and these are not excluded from the scope of the present invention.

INDUSTRIAL APPLICABILITY

The optical deflection device according to the present invention can be applied to, for example, laser LIDARs mounted on automobiles, drones, robots, etc., 3D scanners mounted on personal computers or smartphones to easily capture a surrounding environment, monitoring systems, and spatial matrix optical switches for optical exchange and data centers.

REFERENCE CHARACTERS LIST

1 OPTICAL DEFLECTION DEVICE
1a, 1b OPTICAL DEFLECTION DEVICE
2 OPTICAL WAVEGUIDE PART
2A ONE-DIMENSIONAL PHOTONIC CRYSTAL WAVEGUIDE
2B ONE-DIMENSIONAL PHOTONIC CRYSTAL WAVEGUIDE
2C TO 2H TWO-DIMENSIONAL PHOTONIC CRYSTAL WAVEGUIDE
2a SLOW LIGHT WAVEGUIDE
2b UPPER CLADDING
2c LOWER CLADDING
3 EMISSION PART
3B AIR-BRIDGE DIFFRACTION GRATING
3C AIR-BRIDGE DIFFRACTION GRATING
3D TO 3J DIFFRACTION GRATING
3a SURFACE DIFFRACTION GRATING
3b, 3c CIRCULAR HOLE
4 WAVELENGTH CONTROL UNIT
5 REFRACTIVE INDEX CONTROL UNIT
6 EMISSION ANGLE CONTROL UNIT
7, 7a, 7b SWITCH
8a TO 8f OPTICAL PATH
9, 9a CYLINDRICAL LENS
9b PLASTIC MOLD
10 INCIDENT WAVEGUIDE
11 SWITCHING UNIT
12 PHASE ADJUSTER
13 ARRAY INTEGRATION
14 POWER DISTRIBUTOR
15 ARRAY INTEGRATION
21 HIGH REFRACTIVE INDEX MEDIUM
22 LOW REFRACTIVE INDEX MEDIUM
23 REFRACTIVE INDEX CHANGE PART
31 HIGH REFRACTIVE INDEX MEDIUM
32 LOW REFRACTIVE INDEX MEDIUM
33 REFRACTIVE INDEX CHANGE PART
40 HIGH REFRACTIVE INDEX SUBSTRATE
41 SUBSTRATE
42 REFLECTOR
50 PULSE LIGHT SOURCE
60 PHOTODETECTOR
70 OPTICAL FILTER
80 INCIDENT WAVEGUIDE
90 OPTICAL SWITCH
100 LIDAR APPARATUS

The invention claimed is:

1. An optical deflection device that is a silicon photonics device comprising periodic structures of a refractive index, wherein the periodic structures comprise:

a first periodic structure comprising a second refractive index medium at a period a in a first refractive index medium that is a silicon substrate, the second refractive index medium including a refractive index different from that of the first refractive index medium, the first periodic structure constituting an optical waveguide part, and the optical waveguide part including at least one end in a periodic direction as an incident end; and a second periodic structure comprising the second refractive index medium at a period $\Lambda(a<\Lambda\leq 2a)$ that is longer than the period a of the first periodic structure in the first refractive index medium, the second refractive index medium including a refractive index different from that of the first refractive index medium, the second periodic structure constituting an emission part, and the emission part including a side end in the periodic direction as an emission end, wherein a position where the second periodic structure is disposed is a peripheral part of an intensity distribution of light propagating through the optical waveguide part composed of the first periodic structure, and the period a is $a=\lambda/2n$ (n is an equivalent refractive index of the light propagating through the optical waveguide part composed of the first periodic structure, and $\lambda$ is a wavelength near a Bragg wavelength), wherein the optical waveguide part is an air-bridge slow light waveguide comprising an air layer between claddings on the silicon substrate, or a cladding embedded slow light waveguide that is embedded in a cladding.

2. The optical deflection device according to claim 1, wherein, in the first periodic structure and the second periodic structure, etches of the first periodic structure are larger than etches of the second periodic structure.

3. The optical deflection device according to claim 1, wherein
the emission part composed of the second periodic structure is a diffraction grating.

4. The optical deflection device according to claim 1, wherein the slow light waveguide is a photonic crystal waveguide composed of a periodic structure of a photonic crystal.

5. The optical deflection device according to claim 3, wherein the diffraction grating is formed with recesses and projections periodically provided in a refractive index medium or with a photonic crystal periodic structure.

6. An optical deflection device that is a silicon photonics device comprising periodic structures of a refractive index, wherein the periodic structures comprise:
a first periodic structure comprising a second refractive index medium at a period a in a first refractive index medium that is a silicon substrate, the second refractive index medium including a refractive index different from that of the first refractive index medium, the first periodic structure constituting an optical waveguide part, and the optical waveguide part including at least one end in a periodic direction as an incident end; and
a second periodic structure comprising the second refractive index medium at a period $\Lambda(a<\Lambda\leq2a)$ that is longer than the period a of the first periodic structure in the first refractive index medium, the second refractive index medium including a refractive index different from that of the first refractive index medium, the second periodic structure constituting a diffraction grating, and the diffraction grating including a side end in the periodic direction as an emission end, wherein
a position where the second periodic structure is disposed is a peripheral part of an intensity distribution of light propagating through the optical waveguide part composed of the first periodic structure,
the period a is $a=\lambda/2n$ (n is an equivalent refractive index of the light propagating through the optical waveguide part composed of the first periodic structure, and $\lambda$ is a wavelength near a Bragg wavelength), and
the diffraction grating is any one of
an air-bridge diffraction grating comprising an air layer between air-bridge slow light waveguides or between claddings of an cladding embedded slow light waveguide,
an embedded diffraction grating, in the cladding in which the cladding embedded slow light waveguide is embedded, embedded in an upper part of an upper cladding, in a lower cladding, or a lower cladding, and
a diffraction grating formed on the silicon substrate.

7. The optical deflection device according to claim 4, wherein
the diffraction gratings are provided on both sides of the photonic crystal waveguide, or
the diffraction grating is provided on an upper surface of the photonic crystal waveguide.

8. The optical deflection device according to claim 4, wherein in the photonic crystal waveguide, the periodic structure of the photonic crystal is composed of a double periodic structure comprising two kinds of periods, which are a short period and a long period,
the periodic structure for the short period constitutes the slow light waveguide of the first periodic structure, and
the periodic structure for the long period constitutes a diffraction grating of the second periodic structure.

9. The optical deflection device according to claim 1, wherein the first periodic structure is a one-dimensional photonic crystal waveguide comprising a linear periodic structure or a two-dimensional photonic crystal waveguide comprising a linear defect in a planar periodic structure.

10. The optical deflection device according to claim 1, further comprising a reflector configured to reflect light emitted from the emission part on a substrate side below the second periodic structure.

11. An optical deflection device that is a silicon photonics device comprising periodic structures of a refractive index, wherein the periodic structures comprise:
a first periodic structure comprising a second refractive index medium at a period a in a first refractive index medium that is a silicon substrate, the second refractive index medium including a refractive index different from that of the first refractive index medium, the first periodic structure constituting an optical waveguide part, and the optical waveguide part including at least one end in a periodic direction as an incident end; and
a second periodic structure comprising the second refractive index medium at a period $\Lambda(a<\Lambda\leq2a)$ that is longer than the period a of the first periodic structure in the first refractive index medium, the second refractive index medium including a refractive index different from that of the first refractive index medium, the second periodic structure constituting a diffraction grating, and the diffraction grating including a side end in the periodic direction as an emission end, wherein
a position where the second periodic structure is disposed is a peripheral part of an intensity distribution of light propagating through the optical waveguide part composed of the first periodic structure,
the period a is $a=\lambda/2n$ (n is an equivalent refractive index of the light propagating through the optical waveguide part composed of the first periodic structure, and $\lambda$ is a wavelength near a Bragg wavelength),
the periodic structure is a planar periodic structure of a photonic crystal comprising circular holes,
the first periodic structure is a two-dimensional photonic crystal waveguide comprising a linear defect in the planar periodic structure, and
the second periodic structure is a double periodic structure in which two types of circular holes with different diameters, which form the first periodic structure, are repeated along the two-dimensional photonic crystal waveguide in the same rows at a period longer than a period at which the circular holes of the first periodic structure are repeated.

12. The optical deflection device according to claim 11, wherein
the double periodic structure comprises a periodic structure in which large diameter circular holes with large diameters are repeated and a periodic structure in which small diameter circular holes with small diameters are repeated,
when the diameter of a reference circular hole is 2r and a difference between the diameters of the circular holes is $2\Delta r$,
the diameter of the large diameter circular holes is $2(r+\Delta r)$, and
the diameter of the small diameter circular holes is $2(r-\Delta r)$.

13. A lidar apparatus comprising:
the optical deflection device according to claim 1;
a pulse light source configured to emit pulse light to the optical deflection device; and
a photodetector configured to detect light received by the optical deflection device.

14. A lidar apparatus comprising:
the optical deflection device according to claim 6;
a pulse light source configured to emit pulse light to the optical deflection device; and
a photodetector configured to detect light received by the optical deflection device.

15. A lidar apparatus comprising:
the optical deflection device according to claim 11;
a pulse light source configured to emit pulse light to the optical deflection device; and
a photodetector configured to detect light received by the optical deflection device.

16. The optical deflection device according to claim 6, wherein, in the first periodic structure and the second periodic structure, etches of the first periodic structure are larger than etches of the second periodic structure.

17. The optical deflection device according to claim 6, wherein the optical waveguide part is photonic crystal slow light waveguide composed of a periodic structure of a photonic crystal.

18. The optical deflection device according to claim 17, wherein
in the photonic crystal waveguide, the periodic structure of the photonic crystal is composed of a double periodic structure comprising two kinds of periods, which are a short period and a long period,
the periodic structure for the short period constitutes the slow light waveguide of the first periodic structure, and
the periodic structure for the long period constitutes the diffraction grating of the second periodic structure.

19. The optical deflection device according to claim 6, wherein the diffraction grating is formed with recesses and projections periodically provided in a refractive index medium or with a photonic crystal periodic structure.

20. The optical deflection device according to claim 6, wherein
diffraction gratings are provided on both sides of the optical waveguide part, or
the diffraction grating is provided on an upper surface of the optical waveguide part.

* * * * *